United States Patent
Homma et al.

(10) Patent No.: US 8,970,634 B2
(45) Date of Patent: Mar. 3, 2015

(54) OPERATION CONTROL DEVICE, OPERATION CONTROL METHOD AND COMPUTER PROGRAM

(75) Inventors: Fuminori Homma, Tokyo (JP); Shunichi Kasahara, Kanagawa (JP); Yusuke Miyazawa, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 13/392,167

(22) PCT Filed: Jun. 28, 2010

(86) PCT No.: PCT/JP2010/060960
§ 371 (c)(1),
(2), (4) Date: Feb. 24, 2012

(87) PCT Pub. No.: WO2011/027611
PCT Pub. Date: Mar. 10, 2011

(65) Prior Publication Data
US 2012/0147052 A1  Jun. 14, 2012

(30) Foreign Application Priority Data
Sep. 2, 2009 (JP) ............................... P2009-202959

(51) Int. Cl.
G09G 5/00 (2006.01)
G06F 3/044 (2006.01)
G06F 3/0488 (2013.01)
G06F 3/0485 (2013.01)

(52) U.S. Cl.
CPC ............ *G06F 3/044* (2013.01); *G06F 3/04883* (2013.01); *G06F 3/04886* (2013.01); *G06F 3/0485* (2013.01); *G06F 2203/04105* (2013.01); *G06F 2203/04806* (2013.01)
USPC ............ 345/684; 345/676; 345/687; 345/173

(58) Field of Classification Search
CPC G09G 2340/0407; G06T 3/40; G06T 3/4007; G06T 3/048; G06T 3/0488; G06T 3/044
USPC .......... 345/668, 684, 687, 173–174, 676, 672
See application file for complete search history.

(56) References Cited

U.S. PATENT DOCUMENTS

2010/0039393 A1* 2/2010 Pratt et al. ...................... 345/173
2011/0163955 A1* 7/2011 Nasiri et al. ................... 345/158

(Continued)

FOREIGN PATENT DOCUMENTS

JP  09-114593  5/1997
JP  11-119882  4/1999

(Continued)

*Primary Examiner* — Chante Harrison
(74) *Attorney, Agent, or Firm* — Sherr & Jiang, PLLC

(57) ABSTRACT

An operation control device includes a contact detection unit for detecting contact of an operation body with a display surface of a display unit on which information is displayed, a pressure detection unit, provided on the display unit, for detecting a pressure at which the operation body presses the display surface of the display unit, and an operation control unit for changing a display state of the information displayed on the display unit in a forward or reverse direction on the basis of an amount of pressure detected by the pressure detection unit until the operation body makes contact with and is separated from the display surface of the display unit.

14 Claims, 22 Drawing Sheets

(56) References Cited

U.S. PATENT DOCUMENTS

2013/0127765 A1* 5/2013 Behdasht et al. ............. 345/173
2013/0154982 A1* 6/2013 Hotelling et al. ............. 345/173
2013/0257806 A1* 10/2013 Abe et al. ...................... 345/174

FOREIGN PATENT DOCUMENTS

| JP | 2002-213989 | 7/2002 |
|----|-------------|--------|
| JP | 2006-039745 | 2/2006 |
| JP | 2009-009422 | 1/2009 |

* cited by examiner

FIG. 7A
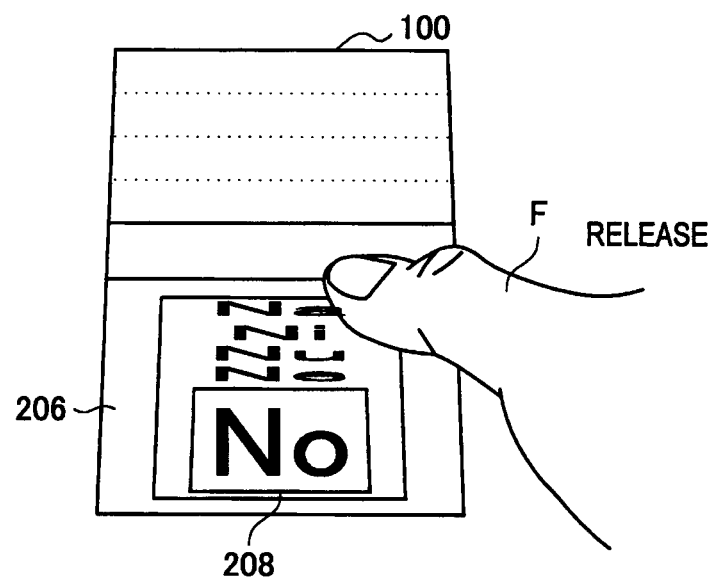
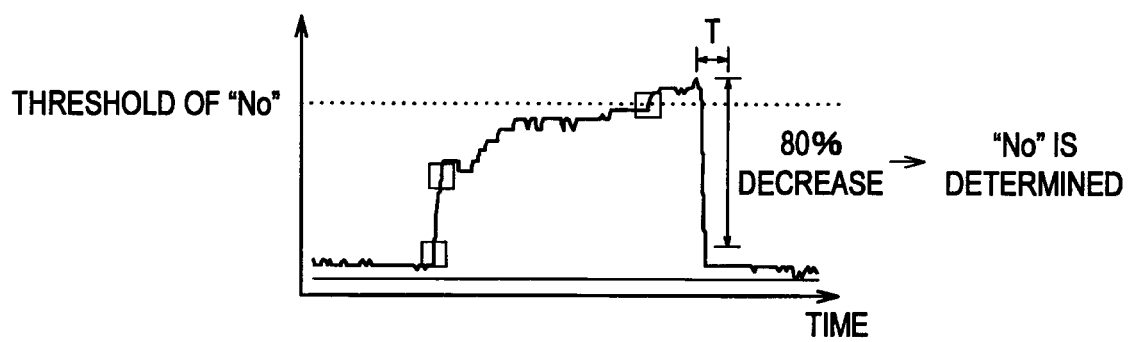

FIG. 7B
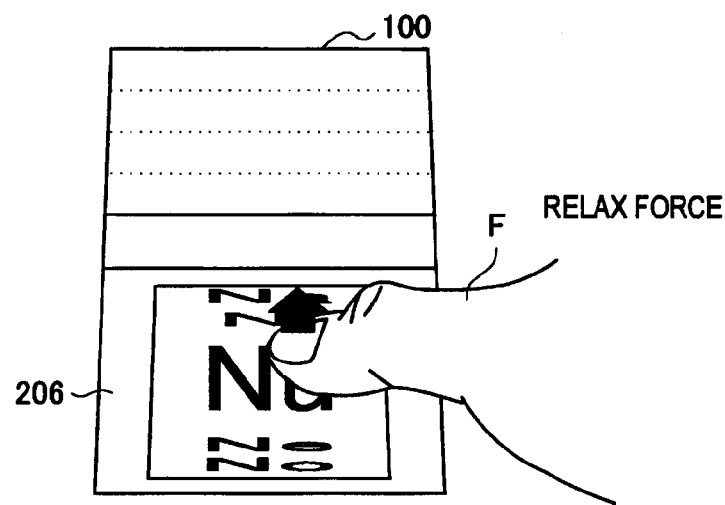
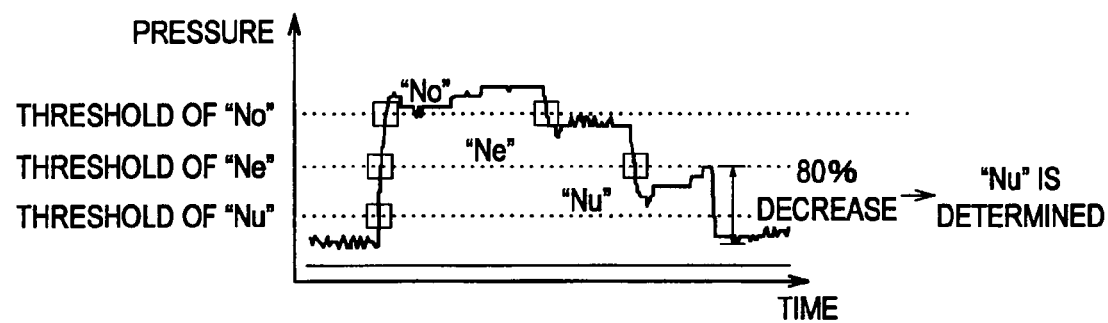

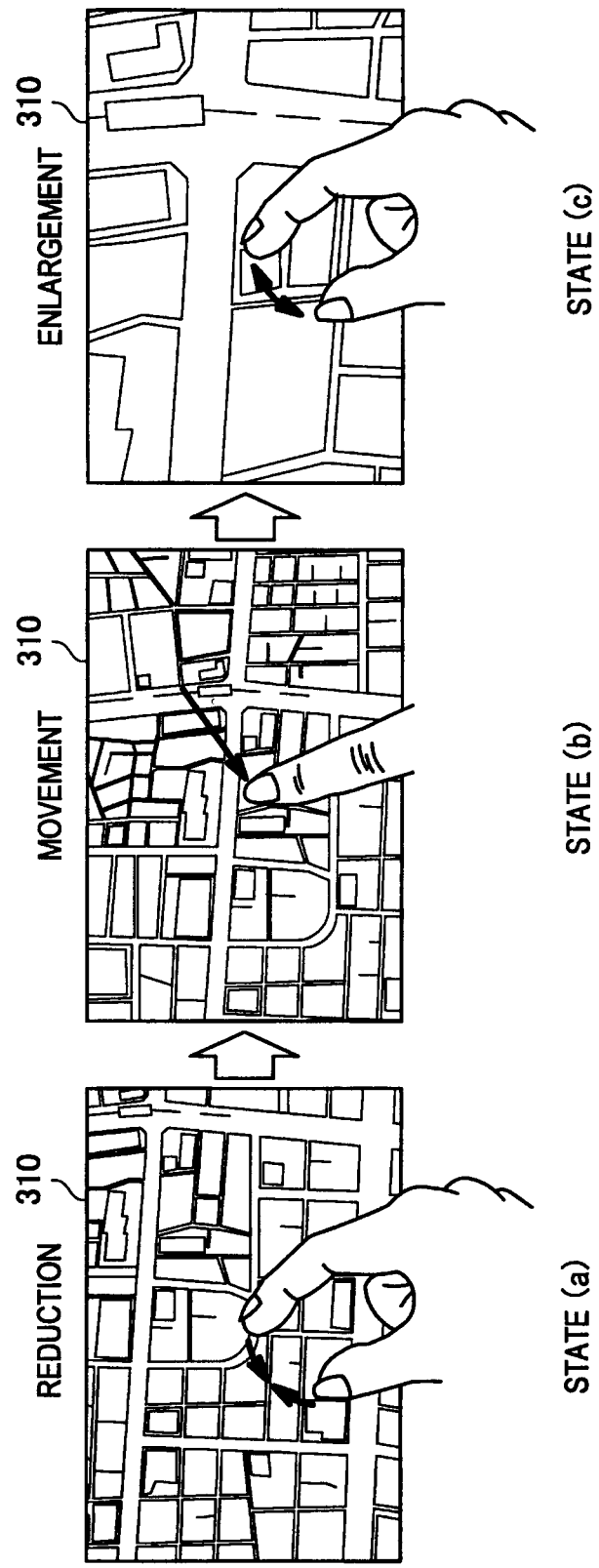

FIG. 13
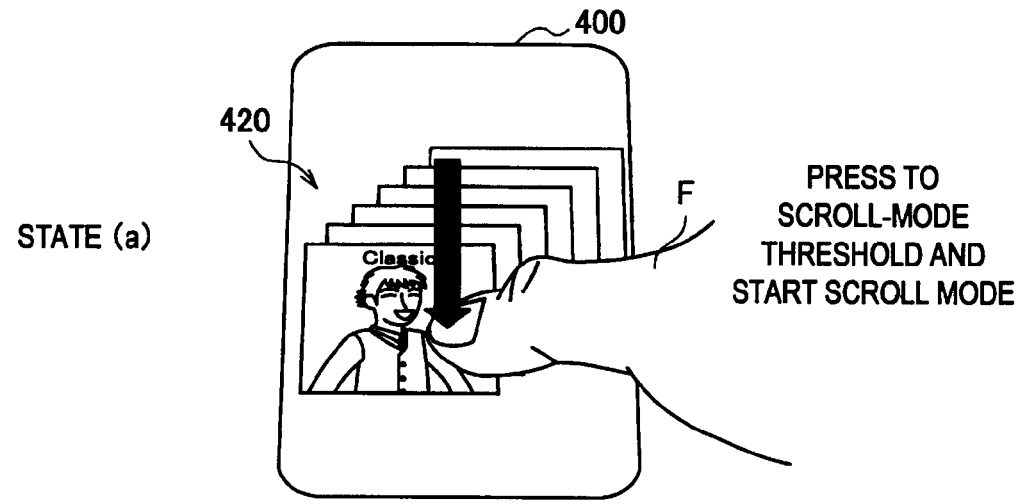
STATE (a) — PRESS TO SCROLL-MODE THRESHOLD AND START SCROLL MODE
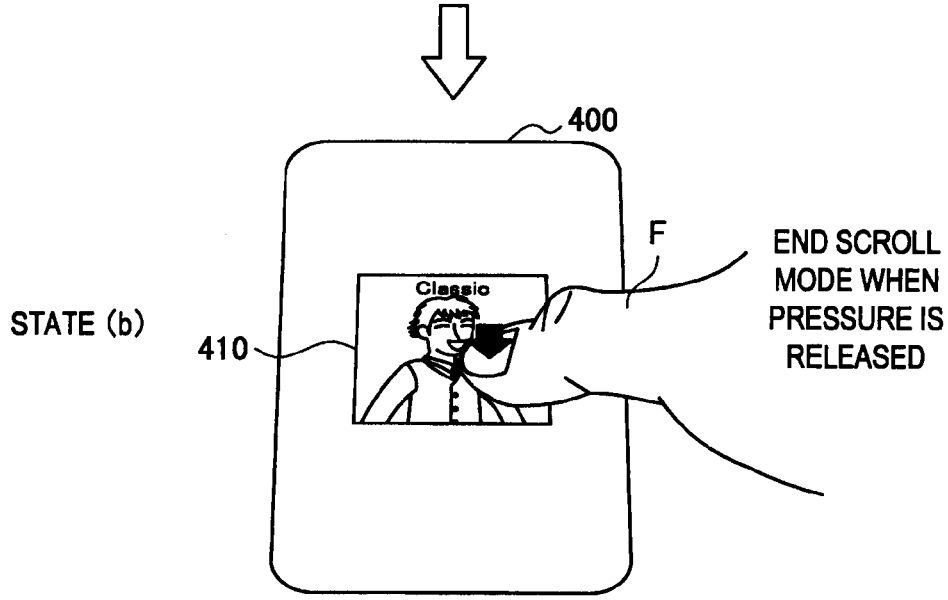
STATE (b) — END SCROLL MODE WHEN PRESSURE IS RELEASED
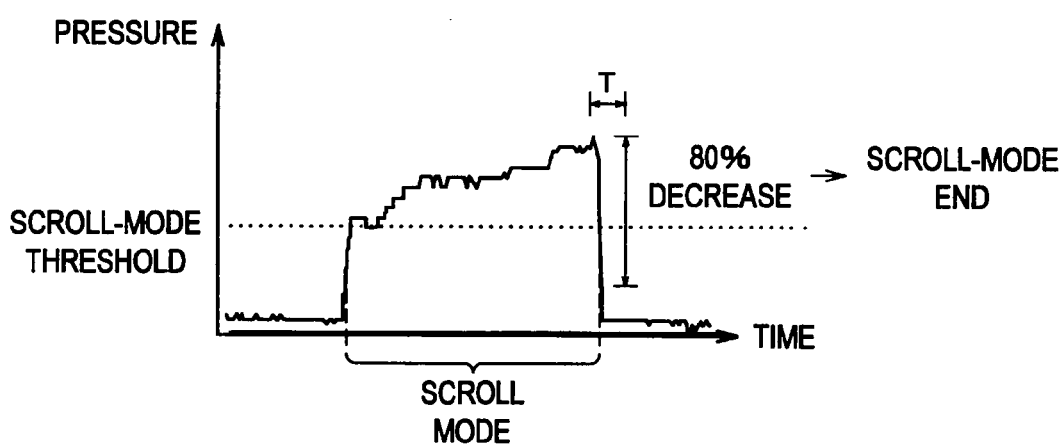

FIG. 15
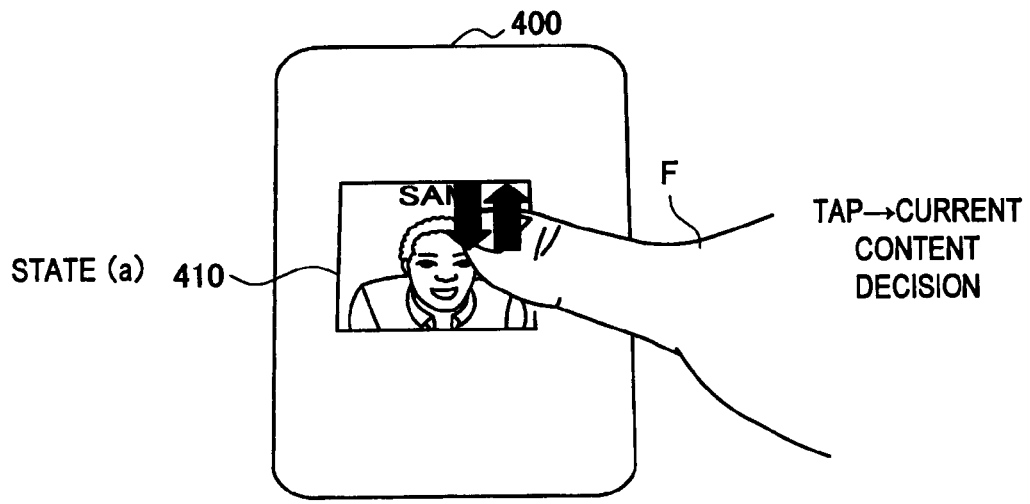
STATE (a) 410
TAP→CURRENT CONTENT DECISION
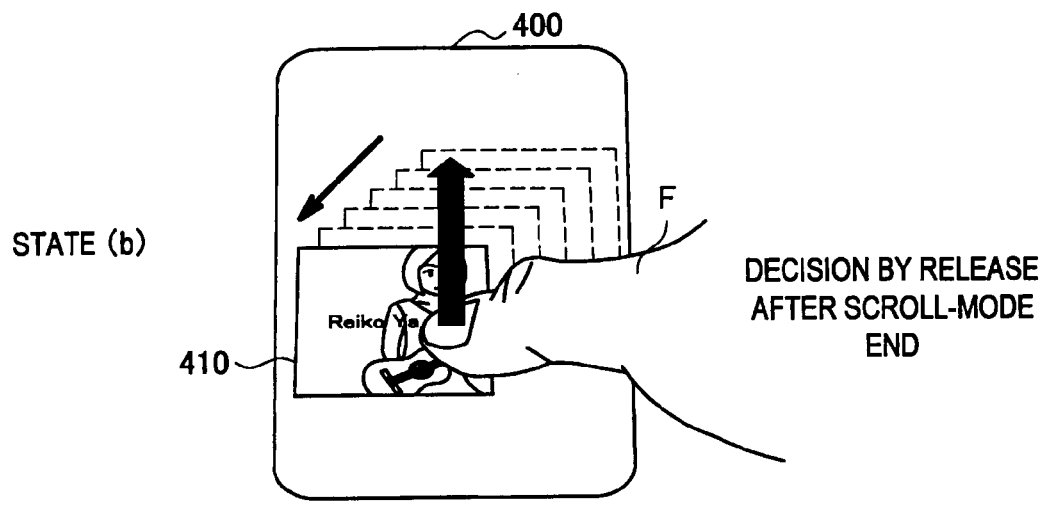
STATE (b) 410
DECISION BY RELEASE AFTER SCROLL-MODE END
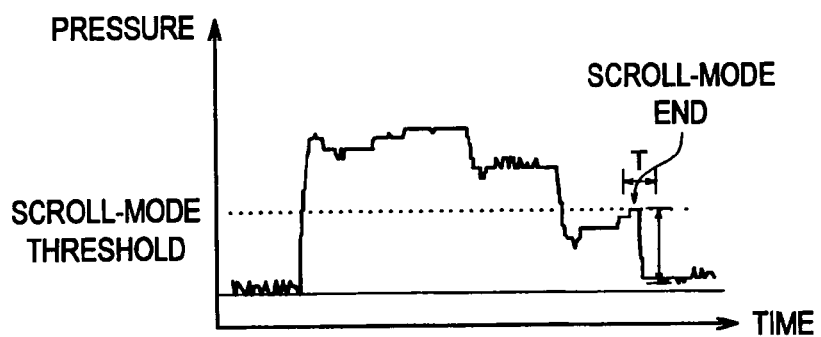

FIG. 17
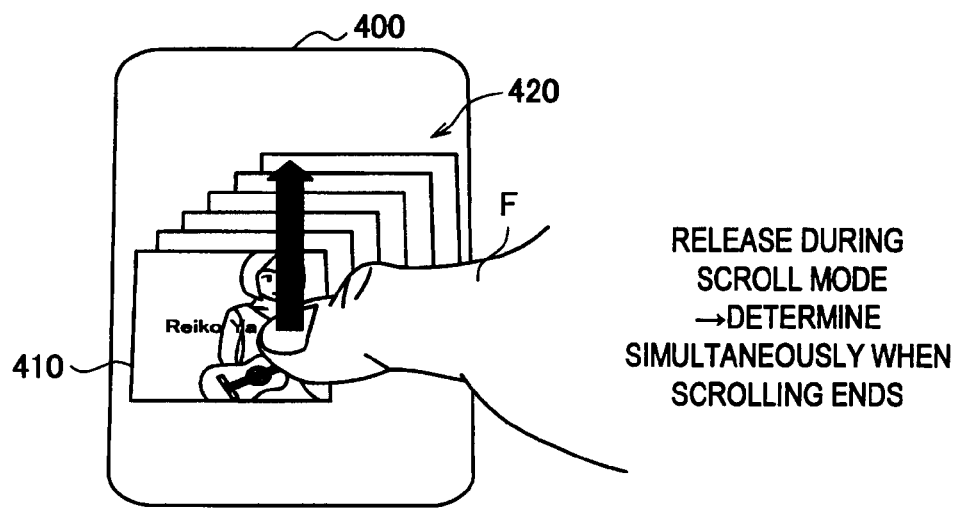
RELEASE DURING
SCROLL MODE
→DETERMINE
SIMULTANEOUSLY WHEN
SCROLLING ENDS
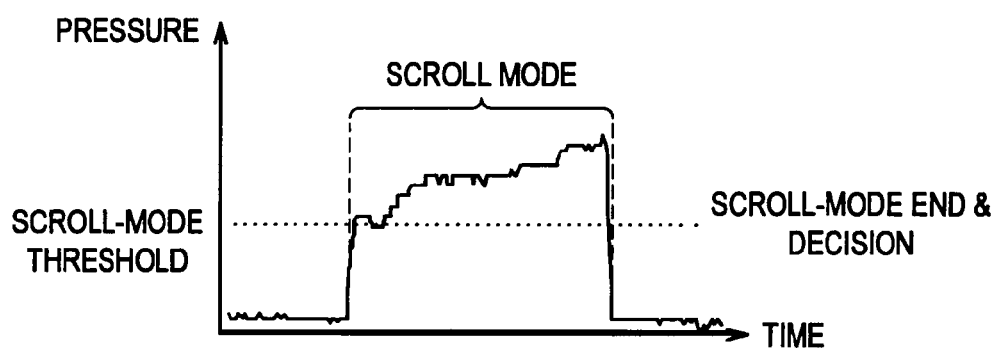

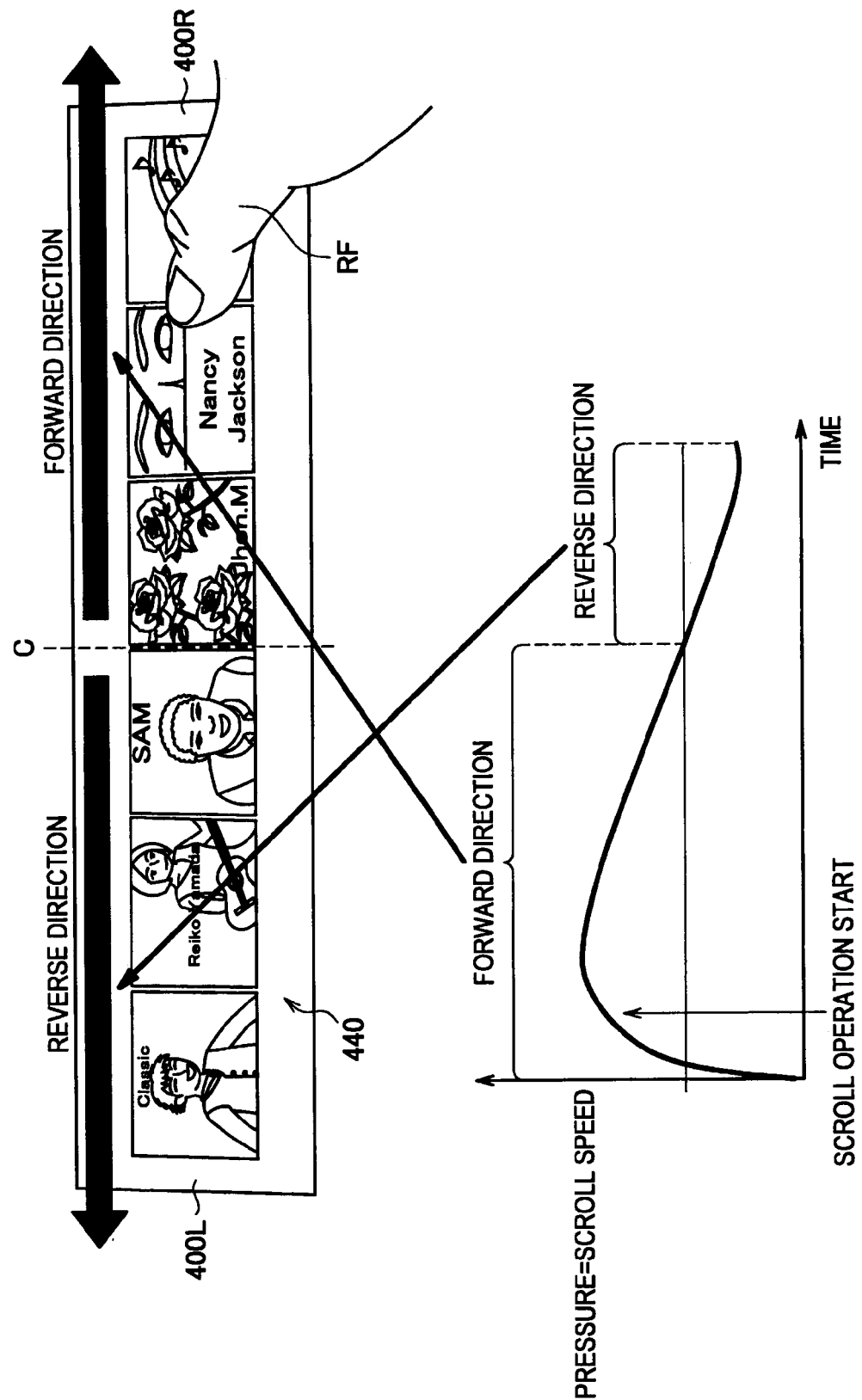

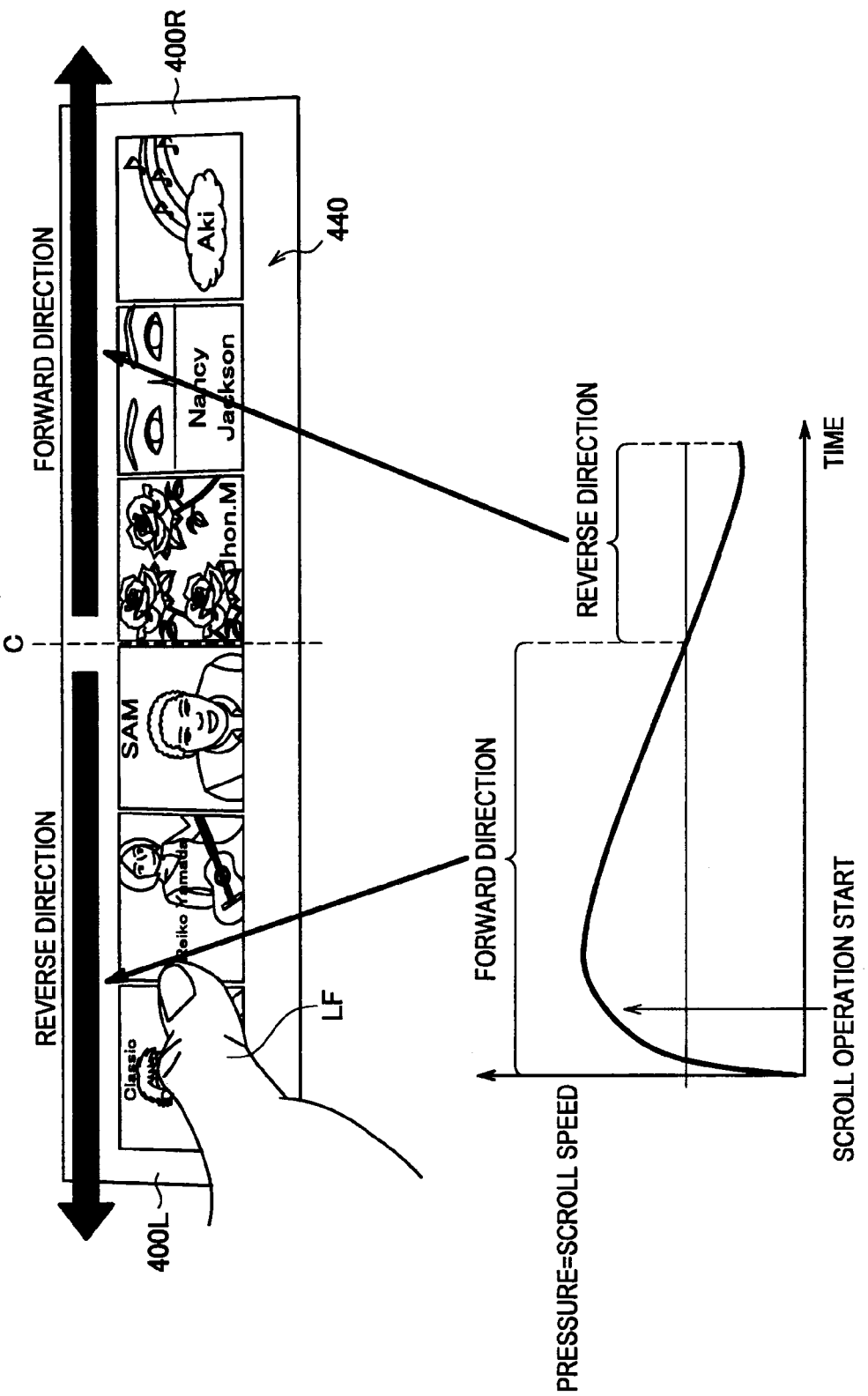

OPERATION CONTROL DEVICE, OPERATION CONTROL METHOD AND COMPUTER PROGRAM

TECHNICAL FIELD

The present invention relates to an operation control device, an operation control method, and a computer program, and more particularly, to an operation control device, an operation control method, and a computer program using a software keyboard used to input characters in a mobile information terminal.

BACKGROUND ART

In recent years, thanks to advances in electronics technology, mobile information terminals using a touch screen have come into wide use. In order to input a predetermined character using such a mobile information terminal, a user may press a corresponding key with a fingertip or an operation body such as a touch pen using a software keyboard, which is displayed on a display and has substantially the same arrangement as an actual keyboard. However, because the software keyboard displayed on the mobile information terminal using the known touch screen is displayed with substantially the same arrangement as the actual keyboard in a limited screen area, keyboard keys become small. This is therefore a significant strain on the user's eyes, and typographical errors are prone to occur. This problem is even more noticeable in a device with a small touch screen area.

In order to solve this problem, a method for inputting keys using a pressure sensor capable of sensing applied pressure has been proposed (for example, Patent Literature 1). In the method disclosed in Patent Literature 1, only kana characters at the tops of columns in the Japanese syllabary table (that is, "A," "Ka," "Sa," "Ta," "Na," "Ha," "Ma," "Ya," "Ra," and "Wa," which are top kana characters at the tops of columns each including kana characters having the same consonant among 50 kana characters in which 5 vowels are vertically arranged and 10 consonants are horizontally arranged) are allocated to blocks. When one predetermined character (for example, "A") among the top kana characters is touched, subordinate kana characters (for example, "A," "I," "U," "E," and "O") belonging to the touched top character are displayed. At this time, after a focus has moved to a character the user wants to select according to an amount of pressure at which the operation body has touched, the user can select the character by releasing the operation body from a contact surface. Thus, it is possible to implement a software keyboard efficiently using a limited screen area while minimizing hand and eye movements in an operation of selecting the subordinate kana characters from the top kana characters.

CITATION LIST

Patent Literature

Patent Literature 1: JP 11-119882A
Patent Literature 2: JP 2006-39745A

SUMMARY OF INVENTION

Technical Problem

However, the focus can move only in one direction by an operation of applying a force to the contact surface as illustrated in FIG. 20 in the method disclosed in Patent Literature 1. That is, as illustrated in FIG. 20, the focus moves to the next character every time the force pressing a key exceeds a pressure level, and the focus does not move when the force is weak. That is, the focus can move only in one direction as in "A," "I," "U," "E," "O", "A," "I," .... Thus, for example, if the focus moves to "I" due to the force excessively applied by mistake when "A" is selected, the focus should come full circle by applying the force again to select "A." In particular, there is a problem in that operability is significantly degraded when there are many subordinate kana characters including a voiced or semi-voiced sound.

The present invention has been made in view of the above-described problem, and an object of the invention is to provide a novel and improved operation control device, operation control method, and computer program that can improve operability by changing a moving direction of display content according to a pressure change.

Solution to Problem

According to an aspect of the present invention in order to solve the above-mentioned problem, there is provided an operation control device including: a contact detection unit for detecting contact of an operation body with a display surface of a display unit on which information is displayed; a pressure detection unit, provided on the display unit, for detecting a pressure at which the operation body presses the display surface of the display unit; and an operation control unit for changing a display state of the information displayed on the display unit in a forward or reverse direction on the basis of an amount of pressure detected by the pressure detection unit until the operation body makes contact with and is separated from the display surface of the display unit.

According to the present invention, it is possible to change the display state of the information displayed on the display unit in the forward or reverse direction by changing the pressure at which the operation body presses the display surface in a series of operations until the operation body makes contact with and is separated from the display surface of the display unit. Thereby, it is possible to reduce a user's operational load and improve operability because the display state can easily change in a desired direction.

Here, the operation control unit may change the display state of the information displayed on the display unit in the forward direction every time the pressure detected by the pressure detection unit exceeds one or more pressure thresholds set step by step, and change the display state of the information displayed on the display unit in the reverse direction every time the pressure detected by the pressure detection unit falls below the pressure thresholds set step by step.

Alternatively, the operation control unit may continuously change the display state of the information displayed on the display unit in the forward direction if the pressure detected by the pressure detection unit is greater than a predetermined pressure threshold, and continuously change the display state of the information displayed on the display unit in the reverse direction if the pressure detected by the pressure detection unit is less than the predetermined pressure threshold.

In addition, the operation control unit may start a change in the forward or reverse direction of the display state of the information displayed on the display unit when the pressure detected by the pressure detection unit has exceeded a predetermined pressure threshold.

Further, the operation control unit may end a change in the forward or reverse direction of the display state of the information displayed on the display unit when the pressure detected by the pressure detection unit has decreased by an amount greater than or equal to a predetermined ratio within a predetermined time.

In addition, when an object list in which a plurality of objects are arranged in one direction is displayed on the display unit, the operation control unit may scroll the object list in the forward direction step by step every time the pressure detected by the pressure detection unit exceeds one or more pressure thresholds set step by step, and scroll the object list in the reverse direction, which is a direction opposite to the forward direction, step by step every time the pressure detected by the pressure detection unit falls below the pressure thresholds set step by step.

Alternatively, when an object list in which a plurality of objects are arranged in one direction is displayed on the display unit, the operation control unit may continuously scroll the object list in the forward direction if the pressure detected by the pressure detection unit is greater than a predetermined pressure threshold, and continuously scroll the object list in the reverse direction, which is a direction opposite to the forward direction, if the pressure detected by the pressure detection unit is less than the predetermined pressure threshold.

Further, the contact detection unit may detect a contact area in contact with the operation body between two areas into which the display surface of the display unit is divided in an arrangement direction of the objects, and the operation control unit may set a direction toward the contact area among scrolling directions of the object list to the forward direction.

In addition, the operation control unit may determine selection of a focused object of the object list when the pressure detected by the pressure detection unit has decreased by an amount greater than or equal to a predetermined ratio within a predetermined time.

Here, when an object determined from the object list has time-series data, the operation control unit may reproduce the determined object in order of time series when the contact detection unit has detected that the operation body has been separated from the display surface of the display unit, and move display of the determined object in a forward or reverse direction of time series according to an amount of pressure detected by the pressure detection unit if the contact detection unit detects that the operation body is continuously in contact with the display surface of the display unit.

In addition, when information for changing a zoom ratio of display content is displayed on the display unit, the operation control unit may decrease the zoom ratio of the display content displayed on the display unit step by step every time the pressure detected by the pressure detection unit exceeds one or more pressure thresholds set step by step, and increase the zoom ratio of the display content displayed on the display unit step by step every time the pressure detected by the pressure detection unit falls below the pressure thresholds set step by step.

Alternatively, when information for changing a zoom ratio of display content is displayed on the display unit, the operation control unit may decrease the zoom ratio of the display content displayed on the display unit step by step if the pressure detected by the pressure detection unit is greater than a predetermined pressure threshold, and increase the zoom ratio of the display content displayed on the display unit step by step if the pressure detected by the pressure detection unit is less than the predetermined pressure threshold.

At this time, the operation control unit may fix a currently set zoom ratio when the pressure detected by the pressure detection unit has decreased by an amount greater than or equal to a predetermined ratio within a predetermined time.

In addition, the operation control unit may move a display range of the information displayed on the display unit according to movement of the operation body in a state in which the operation body is in contact with the display surface of the display unit, and change the zoom ratio to a zoom ratio before a change when the contact detection unit has detected that the operation body has been separated from the display surface of the display unit.

According to another aspect of the present invention in order to solve the above-mentioned problem, there is provided an operation control method including the steps of: detecting contact of an operation body with a display surface of a display unit on which information is displayed; detecting a pressure at which the operation body presses the display surface of the display unit in a state in which a detection unit is provided on the display unit; and changing a display state of the information displayed on the display unit in a forward or reverse direction on the basis of an amount of pressure detected until the operation body makes contact with and is separated from the display surface of the display unit.

According to another aspect of the present invention, there is provided a computer program for causing a computer to function as the operation control device described above. The computer program is stored in a storage device provided in the computer, and read and executed by a central processing unit (CPU) included in the computer, thereby causing the computer to function as the operation control device described above. In addition, there is also provided a computer readable recording medium in which the computer program is stored. The recording medium may be, for example, a magnetic disk, an optical disk, or the like.

Advantageous Effects of Invention

According to the present invention as described above, it is possible to provide a novel and improved operation control device, operation control method, and computer program capable of improving operability by changing a moving direction of display content according to a pressure change.

BRIEF DESCRIPTION OF DRAWINGS

FIG. 7A is an explanatory diagram illustrating an operation of determining the subordinate kana character.

FIG. 7B is an explanatory diagram illustrating an operation of returning a focus position of the subordinate kana character by scrolling a scroll list in a reverse direction.

FIG. 8 is an explanatory diagram illustrating an operation of changing a zoom ratio of display content in the related art.

FIG. 13 is an explanatory diagram illustrating operations of starting and ending a scroll mode of a content list according to the same embodiment.

FIG. 15 is an explanatory diagram illustrating an operation of determining content from the content list according to the same embodiment.

FIG. 17 is an explanatory diagram illustrating an operation when an operation body has been released during the scrolling of the content list according to the same embodiment.

FIG. 18A is an explanatory diagram illustrating a scroll operation in a lateral content list.

FIG. 18B is an explanatory diagram illustrating a scroll operation in a lateral content list.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Description will be given in the following order.

1. First Embodiment (Application Example of Software Keyboard)

2. Second Embodiment (Application Example of Zoom Ratio Change Display)

3. Third Embodiment (Application Example of Operation of Scrolling Content List)

1. First Embodiment

[Configuration Example of Display Device of Input Display Device]

Figure 1:
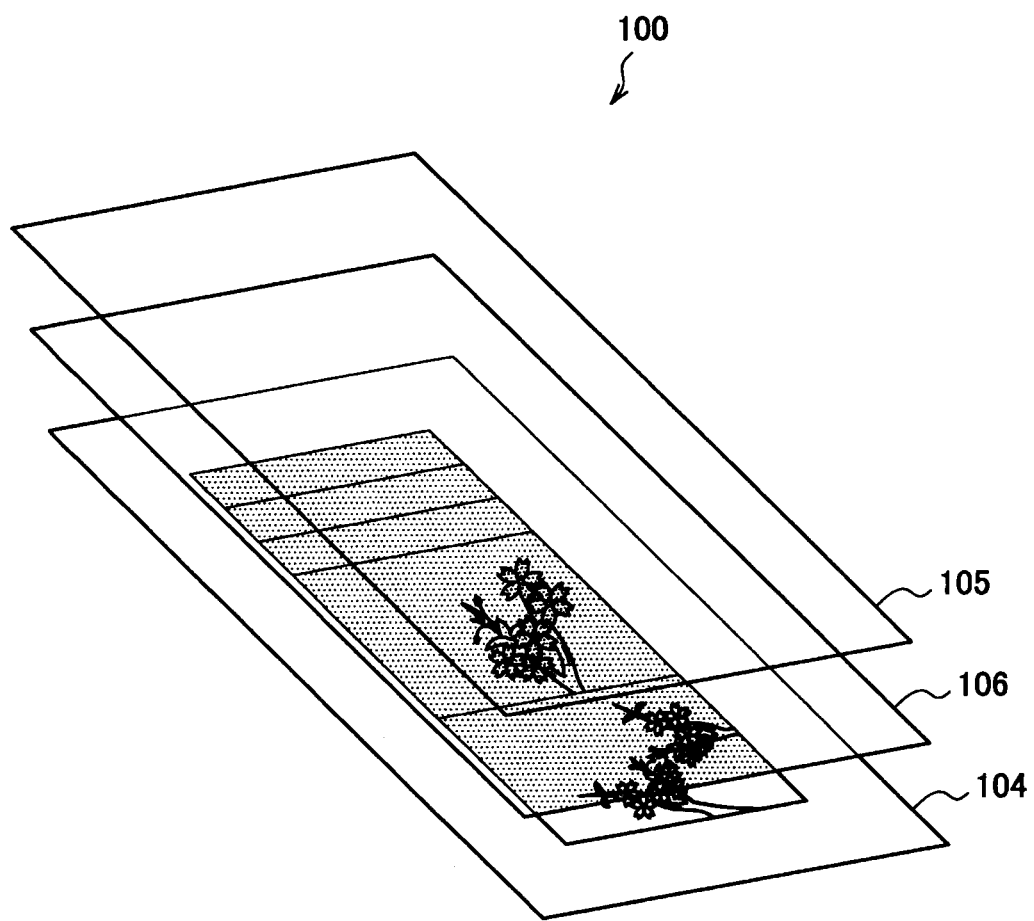
FIG. 1 is an explanatory diagram illustrating a configuration of a display device of an input display device including an operation control unit according to a first embodiment of the present invention.
Figure 2:
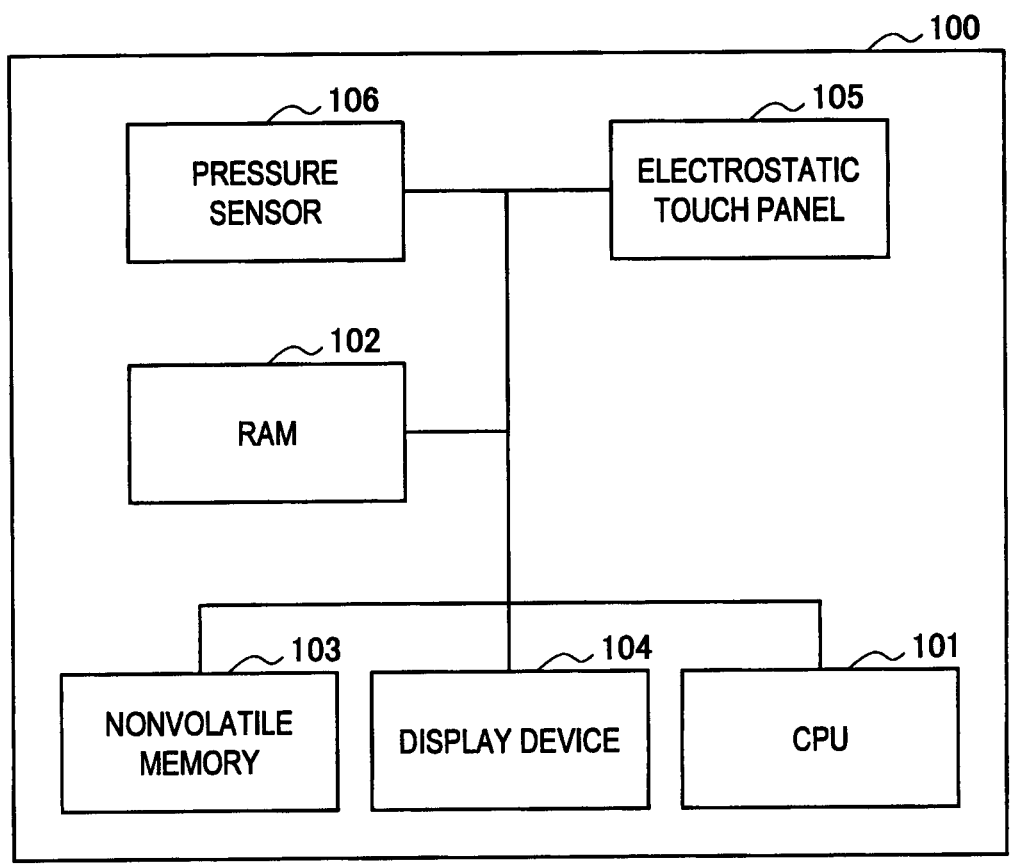
FIG. 2 is a block diagram illustrating a hardware configuration of the input display device including the operation control unit according to the same embodiment.
Figure 3:
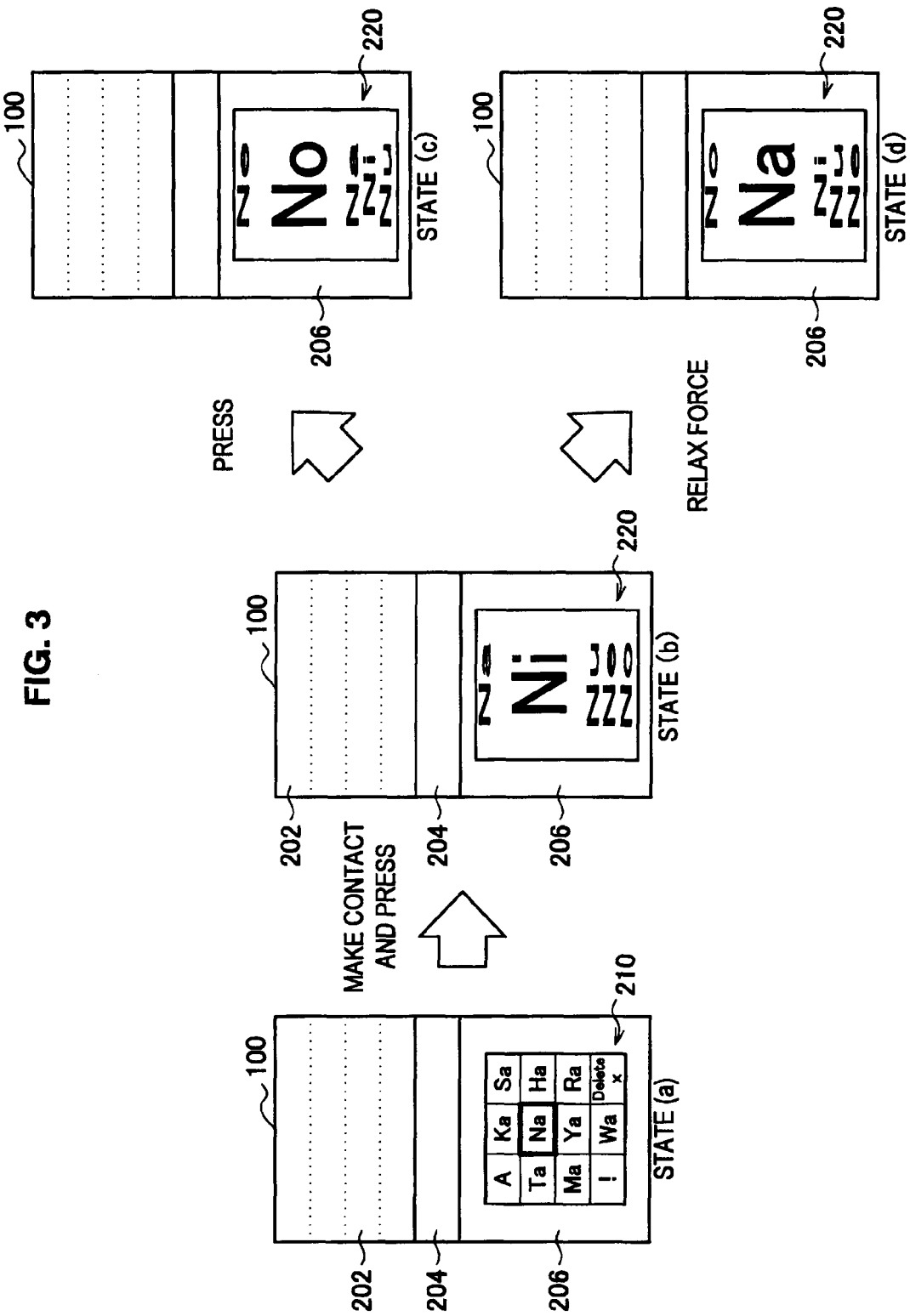
FIG. 3 is an explanatory diagram illustrating a configuration example of a screen of a software keyboard in an input display unit according to the same embodiment.

First, the configuration example of the display device of the input display device including an operation control unit according to the first embodiment of the present invention and an overview of the input display device will be described on the basis of FIGS. 1 to 3. FIG. 1 is an explanatory diagram illustrating a configuration of a display device of an input display device 100 including an operation control unit according to this embodiment. FIG. 2 is a block diagram illustrating a hardware configuration of the input display device including the operation control unit according to this embodiment. FIG. 3 is an explanatory diagram illustrating a configuration example of a screen of a software keyboard in the input display device 100 according to this embodiment.

The input display device 100 including the operation control unit according to this embodiment is a device to which information can be input by an operation body touching or further pressing a display surface of the display device on which the information is displayed. By having the operation body touch an object such as an icon or a character key displayed on the display device, a user can select or determine the object touched by the operation body. In addition, the user can also perform an operation of scrolling the screen or the like by moving the operation body in contact with the display surface.

As illustrated in FIG. 1, an input display unit (corresponding to reference numeral 110 in FIG. 4) of the input display device 100 as described above has a configuration in which a sheet-like pressure sensor 106 and an electrostatic touch panel 105 are layered on a display surface side of a display device 104.

The electrostatic touch panel 105 is a detection unit that detects contact of the operation body with the display surface. The electrostatic touch panel 105 is provided with electrostatic sensors arranged in a grid pattern, and constantly changes their values according to changes in electrostatic capacitance. When the operation body (for example, a finger) comes close to or touches the electrostatic sensor, the electrostatic capacitance sensed by the electrostatic sensor increases. It is possible to simultaneously obtain the electrostatic capacitances of the electrostatic sensors. By simultaneously detecting and interpolating changes in the electrostatic capacitances of all the electrostatic sensors, it is possible to detect a shape of the finger that comes close to or touches the electrostatic sensors. The electrostatic touch panel 105 outputs a detected electrostatic capacitance value to a CPU (denoted by reference numeral 101 in FIG. 2).

In addition, the pressure sensor 106 is a detection unit that detects pressure at which the display surface is pressed. The pressure sensor 106 forms an electrode surface, for example, with two sheet panels, and may be a resistive film pressure sensor that detects a position by detecting electric conduction in a pressed portion. Like the electrostatic touch panel 105, the pressure sensor 106 also has a plurality of detection points at which a pressed position is detected within a sheet. It is possible to detect electric conduction at detection points simultaneously. The pressure sensor 106 outputs the pressure at which the display surface is pressed, detected at each of the detection points to the CPU.

The CPU associates various information input from the electrostatic touch panel 105 and the pressure sensor 106 with a display position of display content displayed on the display device 104, and analyzes movements of the operation body. Then, the CPU performs processing corresponding to input information by recognizing the input information input to the input display device 100 from the analyzed movements of the operation body. As described above, the user can input the input information by operating content displayed on the display surface. When the operation body is made to touch or press the display surface of the display device 104, the operation body actually makes contact with a surface of the electrostatic touch panel 105 without making contact with the display surface of the display device 104. As described above, even when the operation body actually makes contact with the surface of the electrostatic touch panel 105, this may be described below as "the operation body makes contact with the display surface of the display device 104."

[Hardware Configuration]

Next, the hardware configuration of the input display device 100 including the operation control unit according to this embodiment will be described on the basis of FIG. 2. As illustrated in FIG. 2, the input display device 100 includes a CPU 101, a random access memory (RAM) 102, a nonvolatile memory 103, the display device 104, the electrostatic touch panel 105, and the pressure sensor 106.

As described above, the CPU 101 functions as an arithmetic processing device and a control device, and controls the overall operations within the input display device 100 in accordance with various programs. In addition, the CPU 101 may be a microprocessor. The RAM 102 temporarily stores programs to be used to execute the CPU 101, parameters that appropriately vary with the execution of the CPU 101, and the like. These are mutually connected by a host bus including a CPU bus and the like. The nonvolatile memory 103 stores programs, arithmetic parameters, or the like to be used by the CPU 101. As the nonvolatile memory 103, for example, a read only memory (ROM), a flash memory, or the like may be used.

The display device 104 is one example of an output device that outputs information. As the display device 104, for example, a liquid crystal display (LCD) device, an organic light emitting diode (OLED) device, or the like may be used. The electrostatic touch panel 105 is one example of an input device with which the user inputs information. The electrostatic touch panel 105 includes an input means for inputting information, an input control circuit that generates an input signal based on an input by the user and outputs the input signal to the CPU 101. Like the electrostatic touch panel 105, the pressure sensor 106 is also one example of the input device with which the user inputs information. The electrostatic touch panel 105 and the pressure sensor 106 can be provided with the above-described configurations.

The user can input various data or instruct to perform a processing operation on the input display device 100 by operating the electrostatic touch panel 105 and the pressure sensor 106. In the input display device 100 of this embodiment, the electrostatic touch panel 105 is used as a contact detection unit that detects contact of the operation body for initiating an operation control process, and the pressure sensor 106 is used as a pressure detection unit that detects a pressure change for determining a moving direction of display content.

[Screen Configuration Example]

In this embodiment, it is assumed that the operation control unit provided in the input display device 100 performs operation control of a character input using a software keyboard as illustrated in FIG. 3. As illustrated in a state (a) of FIG. 3, the display surface of the input display device 100 is divided into an input character display area 202 that displays an already input character, a provisional input display area 204 to which a character is provisionally input, and an operation area 206 to which information is input. In the software keyboard used in the input display device 100 of this embodiment, the user determines characters to be input step by step by making contact with the operation area 206 or changing a pressing force by the operation body.

The state (a) of FIG. 3 is a state in which the character input is started. At this time, a top kana character layout keyboard 210 on which top kana characters are arranged is displayed in the operation area 206. On the top kana character layout keyboard 210, 12 keys including "A," "Ka," "Sa," "Ta," "Na," "Ha," "Ma," "Ya," "Ra," "Wa" and two "Symbols" ("!" and "Delete") are arranged in a grid pattern. First, from the top kana character layout keyboard 210, the user selects one key by causing the operation body, such as a finger, to make contact with and press a top kana character of a column to which a character the user wants to input belongs.

When one key is selected from the top kana character layout keyboard 210, the subordinate kana characters, which are subordinate to the top kana character of the selected key, are displayed. For example, it is assumed that the key for the top kana character "Na" is selected in the state (a) of FIG. 3. Then, the subordinate kana characters "Na," "Ni," "Nu," "Ne," "No," and the like, which are subordinate to the top kana character "Na," are displayed. For example, as illustrated in a state (b) of FIG. 3, the subordinate kana characters can be displayed as a scroll list 220 in which the characters are arranged in a single column. That is, the scroll list 220 can be regarded as an object list including subordinate characters that are objects. A focused character in the scroll list 220 is a selectable character. For example, as illustrated in the state (b), the user can be notified of the focused character by enlarging and displaying the focused character in an easy-to-understand manner. In addition, it is possible to make it easy for the user to select the character by enlarging and displaying the focused character.

Here, if the display surface is further pressed from the state (b), the scroll list 220 moves in a forward direction (for example, a direction from bottom to top). For example, if the display surface is further pressed from a state in which the subordinate kana character "Ni" is focused in the state (b), the scroll list 220 moves in the forward direction as illustrated in a state (c), and, for example, the subordinate kana character "No" is focused. On the other hand, if a force with which the display surface is pressed from the state (b) is weak, the scroll list 220 moves in a reverse direction (for example, a direction from top to bottom). For example, if the force with which the display surface is pressed is weak from a state in which the subordinate kana character "Ni" is focused in the state (b), the scroll list 220 moves in the reverse direction as illustrated in a state (d), and, for example, the subordinate kana character "Na" is focused.

As described above, the input display device 100 having the operation control unit according to this embodiment can switch a moving direction of display content by strongly or weakly changing a force with which an operation surface is pressed. Thereby, it is possible to reduce the operational load and improve the operability when display content moves.

Figure 4:
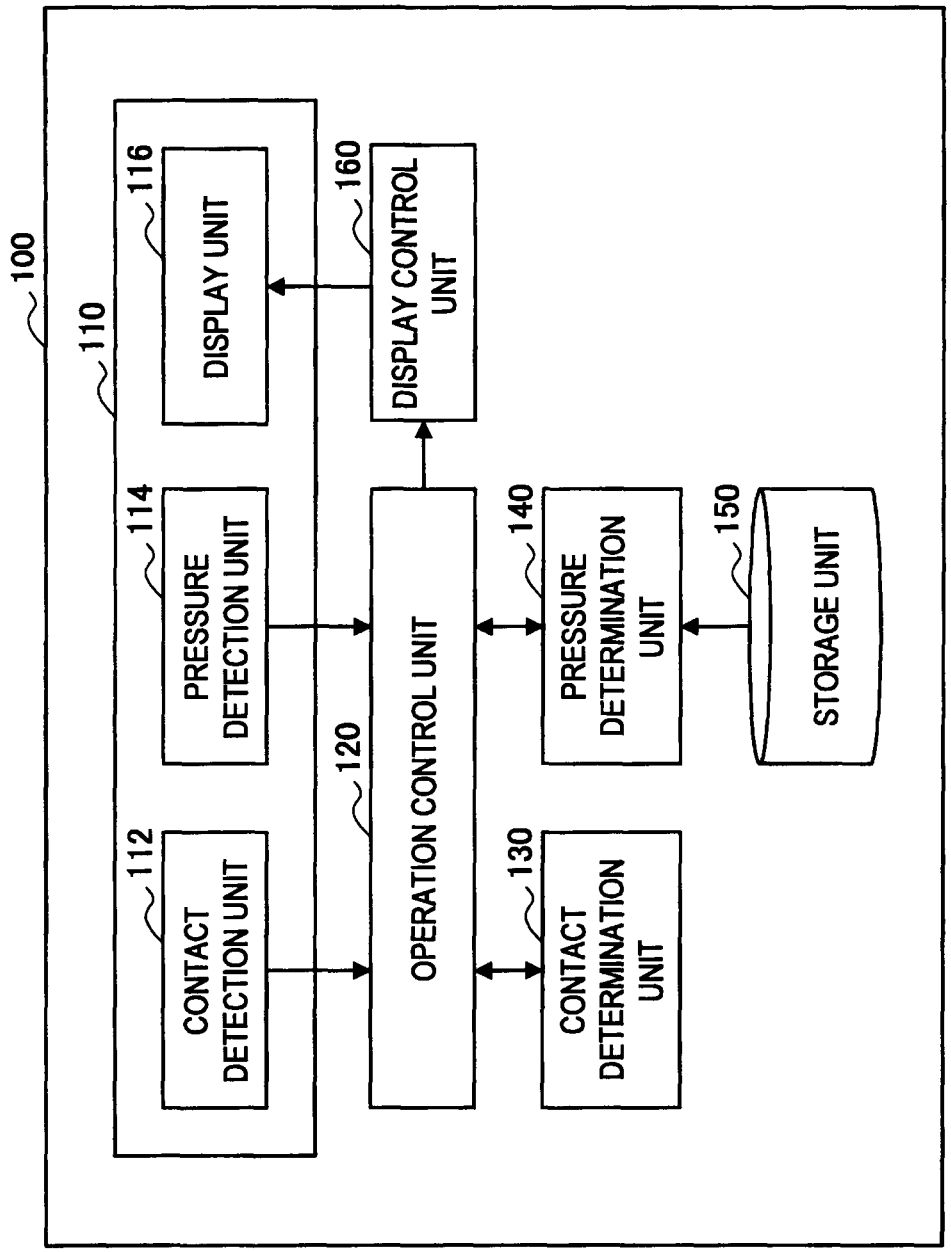
FIG. 4 is a block diagram illustrating a functional configuration of the input display unit according to the same embodiment.
Figure 5:
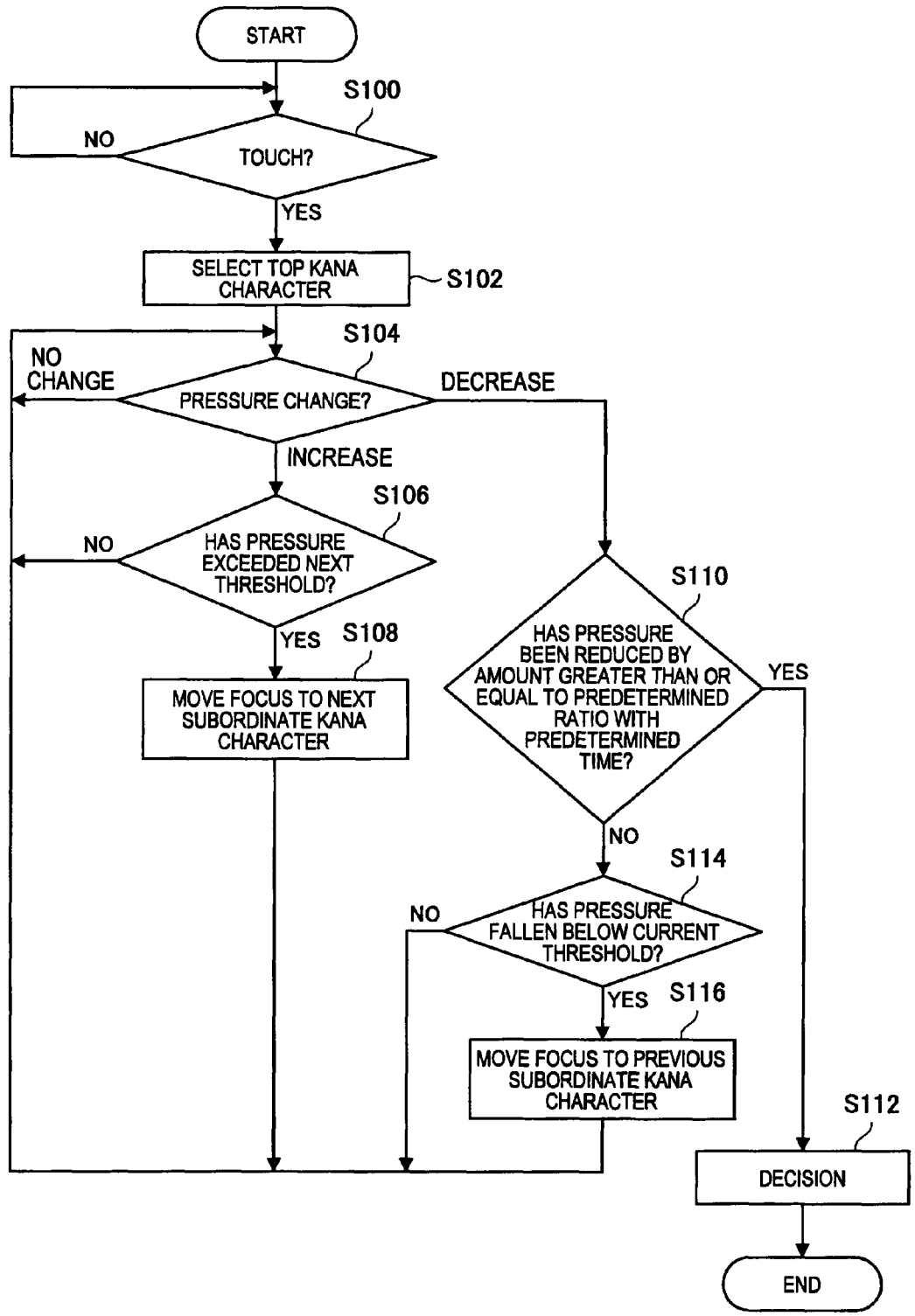
FIG. 5 is a flowchart illustrating an operation control method by the operation control unit according to the same embodiment.
Figure 6:
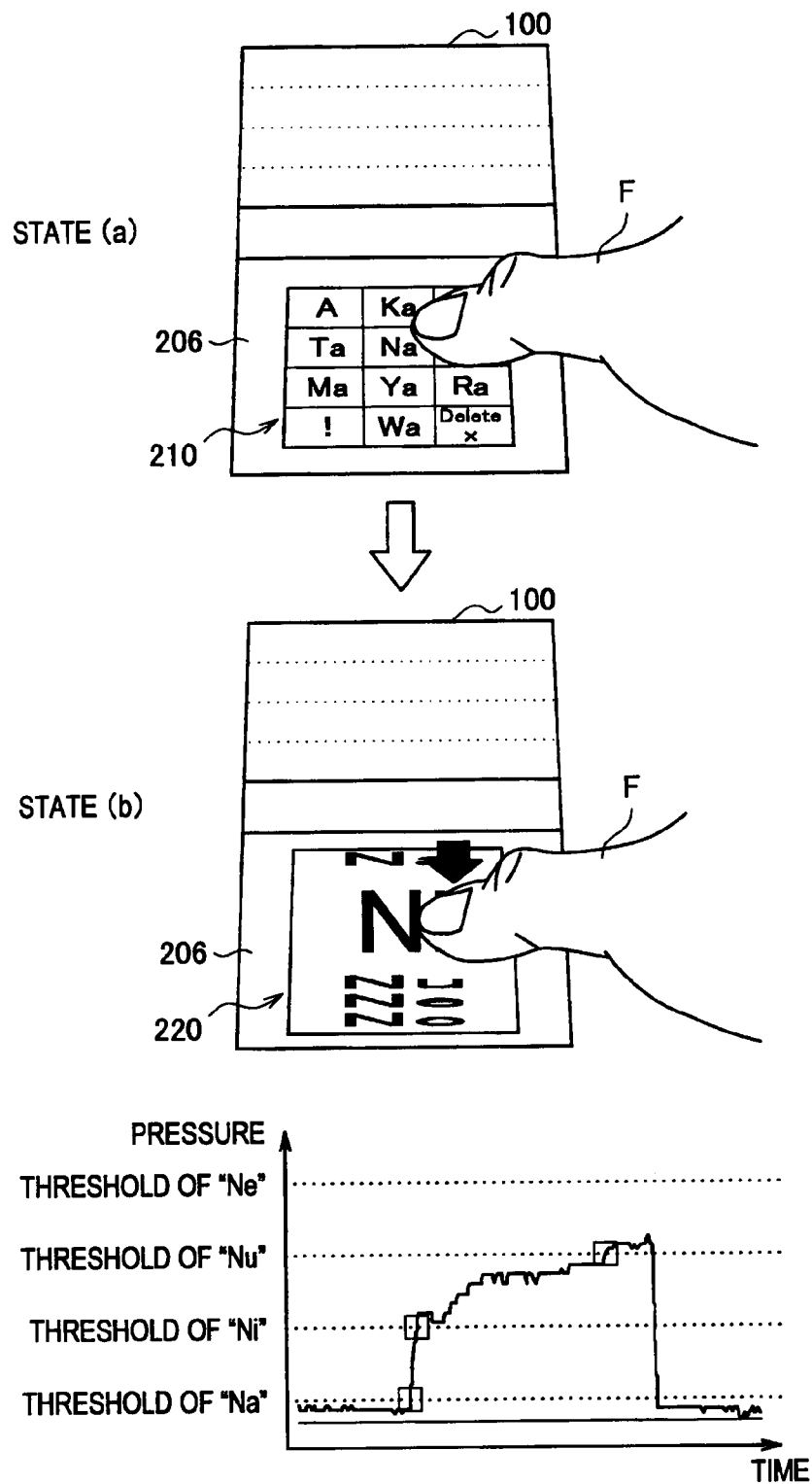
FIG. 6 is an explanatory diagram illustrating an operation of selecting a subordinate kana character.

The schematic configuration and function of the input display device 100 having the operation control unit according to this embodiment has been described above. Hereinafter, operation control in the display control device 100 as described above will be described in further detail on the basis of FIGS. 4 to 7B. FIG. 4 is a block diagram illustrating a functional configuration of the input display device 100 according to this embodiment. FIG. 5 is a flowchart illustrating an operation control method by the operation control unit according to this embodiment. FIG. 6 is an explanatory diagram illustrating an operation of selecting a subordinate kana character. FIG. 7A is an explanatory diagram illustrating an operation of determining a subordinate kana character. FIG. 7B is an explanatory diagram illustrating an operation of returning a focus position of a subordinate kana character.

[Functional Configuration of Input Display Device]

First, the functional configuration of the input display device 100 according to this embodiment will be described on the basis of FIG. 4. As illustrated in FIG. 4, the input display device 100 includes the input display unit 110, an operation control unit 120, a contact determination unit 130, a pressure determination unit 140, a storage unit 150, and a display control unit 160.

The input display unit 110 is a functional unit for displaying information and inputting information, and includes a contact detection unit 112, a pressure detection unit 114 and a display unit 116. The contact detection unit 112 corresponds to the electrostatic touch panel 105 of FIG. 2, and detects a value of electrostatic capacitance that changes according to whether or not the operation body has made contact with the display surface of the display unit 116. As described above, if the operation body makes contact with the display surface, the electrostatic capacitance detected by the contact detection unit 112 increases. Accordingly, it is possible to determine that the operation body has made contact with the display surface when the electrostatic capacitance detected by the contact detection unit 112 has exceeded a predetermined value. The contact detection unit 112 outputs the detected electrostatic capacitance value to the operation control unit 120 as a detection result.

The pressure detection unit 114 corresponds to the pressure sensor 106 of FIG. 2, and detects pressure at which the operation body presses the display surface of the display unit 116. As described above, the pressure detection unit 114 outputs an electrical signal corresponding to an amount of pressure on the operation control unit 120 as a detection result. The display unit 116 is an output device that corresponds to the display device 104 of FIG. 2, and displays information of which display is processed by the display control unit 160.

The operation control unit 120 is a control unit that controls operation of display content of the display unit 116 based on the detection results input from the contact detection unit 112 and the pressure detection unit 114. The operation control unit 120 outputs the electrostatic capacitance value input from the contact detection unit 112 to the contact determination unit 130, and causes the contact determination unit 130 to determine whether or not the operation body has made contact with the display surface of the display unit 116. Then, upon receipt of a determination result of the contact determination unit 130, the operation control unit 120 determines whether or not to start the operation control process on the basis of the determination result.

In addition, the operation control unit 120 outputs the electrical signal input from the pressure detection unit 114 to the pressure determination unit 140, the electrical signal indicating the amount of pressure, and causes the pressure determination unit 140 to determine the amount of pressure or an amount of pressure change caused by an operation of the operation body. Then, upon receipt of the determination result of the pressure determination unit 140, the operation control unit 120 determines a moving direction of display content of the input display device 100 on the basis of the determination result. The operation control unit 120 outputs the determined moving direction of the display content to the display control unit 160.

Based on the detection result of the contact detection unit 112, the contact determination unit 130 determines whether or not the operation body has made contact with the display surface of the display unit 116 and a contact position. When the electrostatic capacitance value detected by each electrostatic sensor of the contact detection unit 112 is input from the operation control unit 120, the contact determination unit 130 determines whether or not the operation body has made contact with the display surface of the display unit 116. The contact determination unit 130 determines that the operation body has made contact with the display surface when an increase amount of electrostatic capacitance has exceeded a predetermined value. In addition, the contact determination unit 130 can also recognize a contact position of the operation body on the display surface from a position at which the electrostatic sensor has detected electrostatic capacitance that is greater than or equal to the predetermined value. Then, the contact determination unit 130 outputs the determination result concerning whether or not the operation body has made contact with the display surface to the operation control unit 120 and also outputs the contact position of the operation body to the operation control unit 120 when determining that the contact has been made.

Based on the detection result of the pressure detection unit 114, the pressure determination unit 140 determines the amount of pressure at which the operation body presses the display surface. In the input display device 100 according to this embodiment, the user can move the display content or the focus by changing the amount of pressure at which the user presses the display surface. Then, the pressure determination unit 140 determines an amount of pressure on the display surface and its change amount so that a type of operation the user is trying to perform using the operation control unit 120 is determined. At this time, the pressure determination unit 140 compares the amount of pressure on the display surface to various pressure thresholds by referring to the storage unit 150, and outputs a comparison result to the operation control unit 120 by referring to the storage unit 150.

The storage unit 150 corresponds to the nonvolatile memory 103 of FIG. 2, and stores various setting information to be used to determine the amount of pressure on the display surface. Examples of the setting information are pressure thresholds set for characters to be used when a list of characters is scrolled, a pressure decrease rate that determines input content, a pressure increase rate serving as a standard for moving the focus in a list of predictive conversion character strings, and the like.

Based on the moving direction of the display content determined by the operation control unit 120, the display control unit 160 changes the display content displayed on the display unit 116. The display control unit 160 generates display information for displaying the display content, and outputs the display information to the display unit 116.

The functional configuration of the input display device 100 according to the embodiment has been described above. Next, the operation control method by the operation control unit 120 of the input display device 100 according to this embodiment will be described on the basis of FIGS. 5 to 7B. Here, the operation control method when kana characters are input as illustrated in FIG. 3 will be described.

[Operation Control Method]

When the user inputs the kana characters using the input display device 100, the user performs a predetermined operation, for example, such as pressing of a keyboard display button, and displays the top kana character layout keyboard 210, as illustrated in the state (a) of FIG. 3, in the operation area 206. Then, by having the operation body make contact with the display surface, the user selects the top kana character to which the character the user wants to input belongs. According to this operation, an operation control process of FIG. 5 is started.

First, as illustrated in FIG. 5, it is determined whether or not the operation body has made contact with (touched) the display surface of the display unit 116 (step S100). The contact of the operation body with the display surface is determined by the contact determination unit 130 according to whether or not the electrostatic capacitance value detected by the contact detection unit 112 has exceeded the predetermined electrostatic capacitance value. The contact determination unit 130 determines that the operation body has made contact with the display surface when the detected electrostatic capacitance value has exceeded the predetermined value, and determines that the operation body has not made contact with the display surface when the detected electrostatic capacitance value is less than the predetermined value. Based on this determination, the determination of step S100 is iterated until the contact of the operation body with the display surface is detected.

In step S100, when the contact of the operation body with the display surface is detected, the top kana character displayed in a contact position of the operation body is selected (step S102). For example, as illustrated in a state (a) of FIG. 6, it is assumed that contact of a finger F as the operation body with the display surface has been detected in a "Na" key area of the top kana character layout keyboard 210. Thus, selection of the "Na" key is determined, and the scroll list 220 is displayed in the operation area 206 as illustrated in a state (b) of FIG. 6. When the scroll list 220 is displayed, the user brings the focus onto the subordinate kana character to be input by changing the pressure with which the finger F in contact with the display surface presses the display surface.

An amount of pressure by the finger F on the display surface is determined by the pressure determination unit 140. First, the pressure determination unit 140 determines whether or not pressure detected by the pressure detection unit 114 has changed from previous pressure (step S104). If it has been determined that there is no pressure change in step S104, the process of step S104 is iterated. On the other hand, if the pressure is determined to have increased in step S104, it is then determined whether or not the detected pressure has exceeded the next set pressure threshold (step S106).

In the input display device 100 according to this embodiment, the scroll list 220 can be scrolled by changing the pressure applied to the display surface. Pressure thresholds of which values are determined in the arrangement order of characters are set for characters displayed on the scroll list 220. In order to move the subordinate kana character arranged in the scroll list 220 in a forward direction (for example, a direction from bottom to top), the operation body presses the display surface so that the pressure exceeds the pressure threshold set for each subordinate kana character. In addition, in order to move the subordinate kana character arranged in the scroll list 220 in a reverse direction (for example, a direction from top to bottom), the force with which the operation body presses the display surface is weakened so that the pressure falls below the pressure threshold set for each subordinate kana character.

That is, time variation in the amount of pressure on the display surface becomes as illustrated in a graph of FIG. 6. In a state in which the "Na" key is selected from the top kana character layout keyboard 210 and the scroll list 220 is displayed as illustrated in the state (a) of FIG. 6, the character "Na" is focused. In the scroll list 220, subordinate kana characters ("Ni," "Nu," "Ne," and "No") belonging to a "Na" column are displayed downward in order from the "Na" character.

The pressure thresholds for the subordinate kana characters are set according to an arrangement of characters. For example, the pressure thresholds are set to gradually increase in order of character arrangement. The pressure thresholds for the characters may be set at regular intervals as illustrated in the graph of FIG. 6 (that is, the pressure thresholds may be set to integral multiples of the pressure threshold of "Na," which is a minimum pressure threshold). In a state in which the character "Na" is focused, when the operation body presses the display surface and the pressing pressure on the display surface exceeds the pressure threshold of the character "Ni," the focus moves to the next arranged character "Ni." Likewise, when the operation body further presses the display surface and the pressing pressure exceeds the pressure threshold of the character "Nu," the focus moves to the next arranged character "Nu." When the operation body presses the display surface and the pressing pressure exceeds the pressure threshold of the character "Ne," the focus moves to the next arranged character "Ne." As described above, the scroll list 220 can be scrolled in the forward direction by the finger F making contact with the display surface and pressing the display surface.

If the pressure is determined to have exceeded the pressure threshold of the next arranged character after a currently focused character in step S106, the operation control unit 120 moves the focus to the next arranged character in order (step S108). Alternatively, in step S106, the operation control unit 120 may move the focus to a character for which a maximum pressure threshold is set by determining the maximum pressure threshold the pressure on the display surface exceeds. For example, in the state (b) of FIG. 6, when the character "Ni" is focused, if the maximum pressure threshold the pressure on the display surface exceeds is the pressure threshold of the character "Ne," the focus moves from the character "Ni" to the character "Ne." As described above, an amount of movement of the focus in a backward direction can be adjusted in accordance with an amount of force with which the finger F presses the display surface.

If the pressure on the display surface has not exceeded the next pressure threshold in step S106, the process is iterated from step S104 without moving the focus.

If the pressure is determined to have decreased in step S104, it is determined whether or not the pressure has decreased by an amount greater than or equal to a predetermined ratio within a predetermined time (step S110). In step S110, it is determined whether or not to input a subordinate kana character focused in the scroll list 220. The determination is made on the basis of a method of relaxing the pressing force on the display surface. For example, when the operation body is released from the display surface or in light contact with the display surface from a state in which the operation body has pressed the display surface, the pressure on the display surface decreases instantaneously to a large extent. Therefore, the pressure determination unit 140 determines that the pressure has decreased by an amount greater than or equal to the predetermined ratio within the predetermined time. In this embodiment, when this operation is performed, the user determines selection of the currently focused character (step S112).

For example, as illustrated in FIG. 7A, it is assumed that in a state in which the character "No" is focused in the scroll list 220, the finger F is released from the operation area 206. At this time, as illustrated in a graph of FIG. 7A, the pressure on an operation surface decreases dramatically within a predetermined time T after exceeding a pressure threshold of the character "No." At this time, the pressure determination unit 140 detects maximum pressure in an interval that goes back by the predetermined time T from a certain time, and determines whether or not the pressure has decreased by an amount greater than or equal to the predetermined ratio with respect to the maximum pressure. Based on the determination result, the operation control unit 120 determines selection of the focused character "No." As illustrated in FIG. 7A, the determined character is surrounded by a decision frame 208 indicating that decision has been made, so that the user may be notified of the fact that the character has been determined. Here, the predetermined time T can be, for example, 100 msec, and the predetermined ratio can be, for example, 80%.

On the other hand, if the pressure is determined not to have decreased by an amount greater than or equal to the predetermined ratio within the predetermined time in step S110, it is determined whether or not the pressure has fallen below the pressure threshold set for the currently focused character (step S114). If the pressure is determined to have fallen below the pressure threshold set for the currently focused character in step S114, the operation control unit 120 moves the focus to a character arranged before the currently focused character (step S116). Here, the character arranged before the currently focused character is adjacent to the currently focused character in the scroll list 220 on a reverse direction side. For example, from a state in which the character "No" has been focused in the scroll list 220, the force with which the finger F in contact with the display surface presses the display surface is slowly relaxed. Then, as illustrated in a graph of FIG. 7B, when the pressure on the display surface falls below the pressure threshold of the character "Ne" arranged before the character "No," the operation control unit 120 moves the scroll list 220 in the reverse direction, and the character "Ne" is focused.

Likewise, if the force with which the finger F presses the display surface is further relaxed slowly, the focus moves to the character "Nu" when the pressure falls below the pressure threshold of the character "Nu" arranged before the character "Ne," and the focus further moves to the character "Ni" when the pressure falls below the pressure threshold of the character "Ni" arranged before the character "Nu." That is, the scroll list 220 can be scrolled in the reverse direction by an operation opposite to steps S10 and S108 and the state (b) of FIG. 6.

Alternatively, in step S106, the operation control unit 120 may determine the maximum pressure threshold below which the pressure on the display surface falls, and move the focus to the character for which the maximum pressure threshold is set. For example, when the character "No" is focused, if the minimum pressure threshold below which the pressing pressure on the display surface falls is set as the pressure threshold for the character "Ni," the focus moves from the character "No" to the character "Ni." As described above, by not suddenly but gradually reducing the force with which the finger F presses the display surface to the pressure threshold of the character to be focused, the focus can largely move in the reverse direction.

When the pressure applied by the operation body on the display surface does not fall below the pressure threshold of the currently focused character in step S114, the process is iterated from step S104 without moving the focus.

The configuration and operation control method of the input display device 100 having the operation control unit according to the first embodiment of the present invention has been described above. When a kana character input keyboard is used as in this embodiment, it is possible to move the scrolling direction of the scroll list 220, which displays subordinate kana characters, in the forward or reverse direction by increasing or decreasing a force with which the operation body presses the display surface when a subordinate kana character is determined after a top kana character to be input by pressing the display surface with the operation body is determined. The user can determine a character to be input by one finger, thereby reducing the user's operational load and improving operability.

2. Second Embodiment

Figure 9:
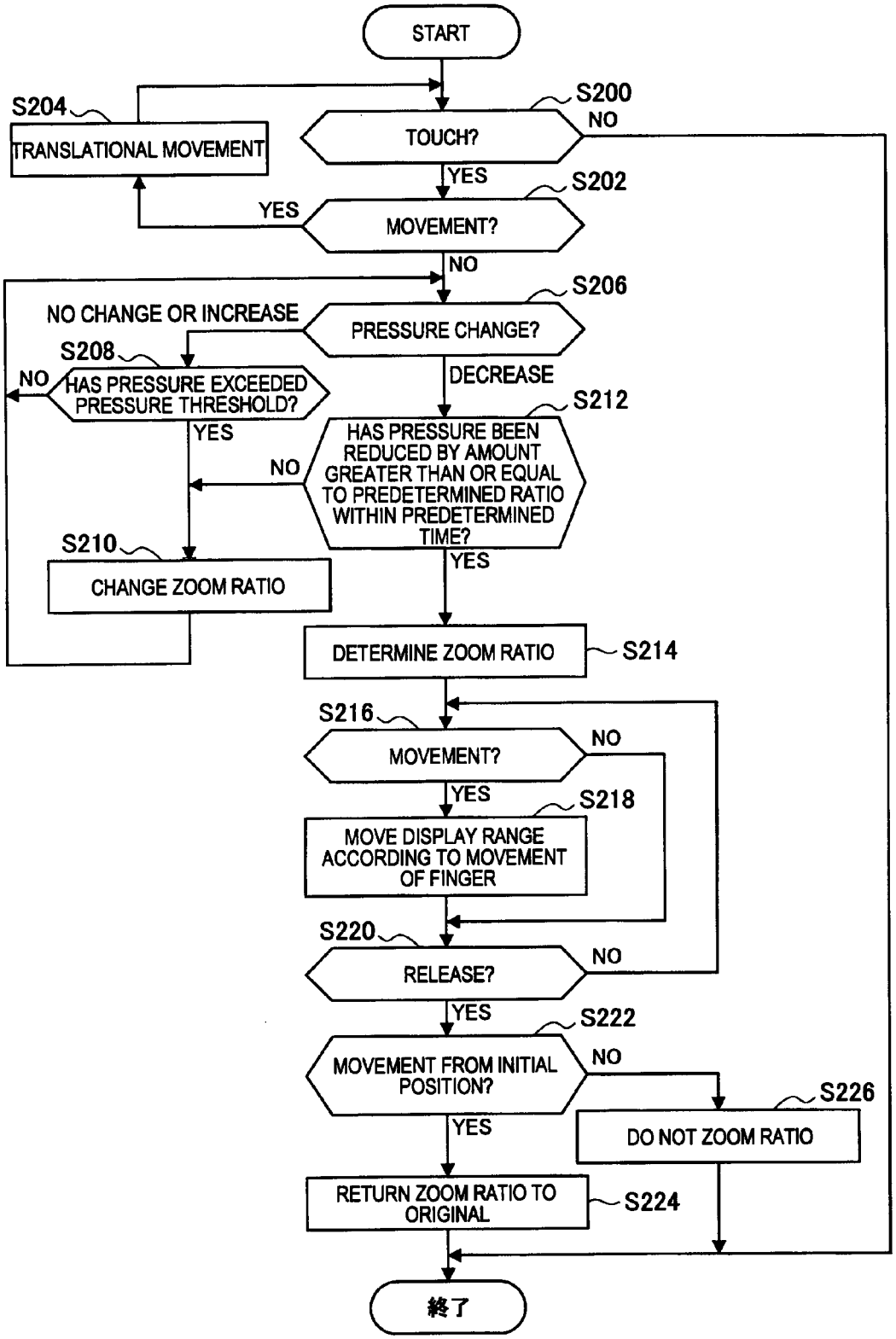
FIG. 9 is a flowchart illustrating an operation control method according to a second embodiment of the present invention.

Next, an operation control method according to the second embodiment of the present invention will be described on the basis of FIGS. 8 to 10. In this embodiment, a zoom ratio of display content is changed by changing the force with which the operation body presses the display surface using the operation control method. The operation control method of this embodiment can be executed by the same device as the input display device 100 having the operation control unit 120 according to the first embodiment. Hereinafter, the operation control method according to this embodiment will be described in detail, and detailed description of the configuration and function of the input display device 100 having the same operation control unit 120 as in the first embodiment is omitted.

FIG. 8 is an explanatory diagram illustrating an operation of changing the zoom ratio of display content in the related art. FIG. 9 is a flowchart illustrating the operation control method according to this embodiment. FIG. 10 is an explanatory diagram illustrating the operation of changing the zoom ratio of display content according to this embodiment.

In general, a zoom ratio suitable to display content is different from a zoom ratio suitable to move a display range. For example, when a display range of a map displayed on the display unit 116 moves, an amount of movement of the display range is small and it is difficult to largely move the map if the zoom ratio is high as compared to when the zoom ratio is small. Thus, when moving the display range, the user reduces display content by first reducing a zoom ratio of the display content displayed on a display area 310 of the display unit 116, for example, as illustrated in a state (a) of FIG. 8. As an operation of reducing the display content, for example, it is possible to use a pinch-in gesture by bringing two fingers close to each other, or the like.

If the display content is reduced, the user moves a finger in a direction in which the user wants to move the display range displayed on the display area 310 by causing the finger to be in contact with the display surface (a state (b) of FIG. 8). Thereby, the display range displayed on the display area 310 moves and changes while following the movement of the finger. Then, if the display range moves to a desired display position, the user enlarges the display content by raising the zoom ratio of the display content (a state (c) of FIG. 8). As an operation of enlarging the display content, for example, it is possible to use a pinch-out gesture of separating two fingers, or the like.

As described above, in the related art, it is necessary to perform three operations of a zoom ratio change, display range movement, and a zoom ratio change on the display area 310. For this situation, it is possible to perform these operations as a series of operations by one finger and reduce the user's operational load using the operation control method according to this embodiment.

[Operation Control Method]

Figure 10:
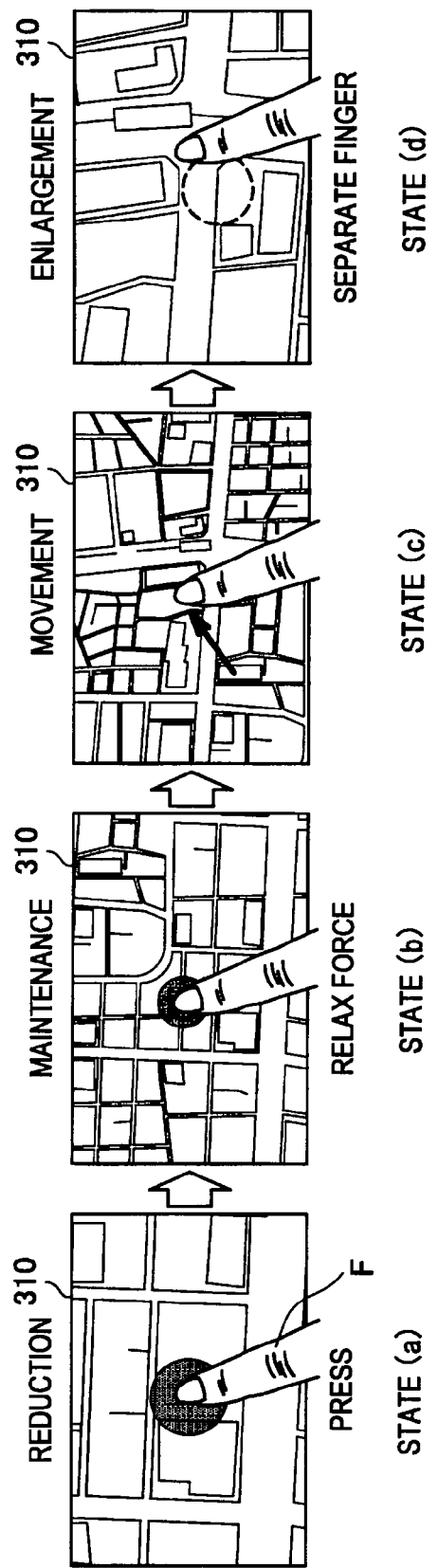
FIG. 10 is an explanatory diagram illustrating an operation of changing a zoom ratio of display content according to the same embodiment.

When a map is displayed using the input display device 100, the user performs a predetermined operation, for example, such as an operation of holding down a map display button, and the state becomes as illustrated in a state (a) of FIG. 10. An initially displayed map can be a map of a current position or a map of a position specified by the user. When changing a display area of the map, the user causes a finger, which is an operation body, to be in contact with the display surface. Thereby, an operation control process illustrated in FIG. 9 is initiated.

First, in the operation control method according to this embodiment, it is detected whether or not the operation body of a finger F or the like has made contact with (touched) the display surface (step S200). The contact determination unit 130 determines the contact of the operation body with the display surface according to whether or not an electrostatic capacitance value detected by the contact detection unit 112 has exceeded a predetermined electrostatic capacitance value. The contact determination unit 130 determines that the operation body has made contact with the display surface when the detected electrostatic capacitance value has exceeded the predetermined value, and determines that the operation body has not made contact with the display surface when the detected electrostatic capacitance value is less than the predetermined value. Based on this determination, this operation control process ends if the contact of the operation body with the display surface is not detected.

If the contact of the operation body with the display surface is detected in step S200, it is determined whether or not the operation body has moved from the contact position (step S202). It is possible to recognize the movement of the operation body from a detection result of either the contact detection unit 112 or the pressure detection unit 114 every predetermined time. For example, if a position where the pressure detection unit 114 has detected an increase in pressure varies with time, it is estimated that the operation body is moving to trace the display surface. As described above, if the operation body is determined to move, the operation control unit 120 causes the display range to move in a moving direction of the operation body according to translational movement (step S204). In this case, the zoom ratio of the display content displayed on the display area 310 is the same as the latest zoom ratio and does not change. The translational movement of the display range is performed until the operation body is released or the movement of the operation body on the move is stopped.

On the other hand, if the operation body in contact with the display surface is determined not to move in step S202, it is determined whether or not there is a change in pressure on the display surface (step S206). The pressure determination unit 140 determines an amount of pressure of the operation body on the display surface. The pressure determination unit 140 first determines whether or not the pressure sensed by the pressure detection unit 114 has changed from pressure in a previous time. Then, if it is determined that there is no pressure change or that the pressure has increased, it is determined whether or not the detected pressure has exceeded the next set pressure threshold (step S208). If it is determined that there is no pressure change in step S206, the process of step S208 is not performed and the process of step S206 may be iterated.

In the operation control method according to this embodiment, it is possible to change a zoom ratio of display content displayed on the display area 310 by changing the pressure to be applied to the display surface. For example, if the pressure on the display surface increases, the zoom ratio of the display content decreases and reduction is made. On the other hand, if the pressure on the display surface decreases, the zoom ratio of the display content increases and enlargement is made. As described above, it is possible to change the zoom ratio in a reduction direction and an enlargement direction by changing pressure on the display surface.

The zoom ratio may change, for example, every time a force with which the display surface is pressed exceeds or falls below a pressure threshold set in correspondence with the zoom ratio. That is, every time the zoom ratio is incremented by a predetermined ratio (for example, 10%), a pressure threshold decremented by the predetermined ratio is set. At this time, every time the force with which the operation body presses the display surface increases to exceed the pressure threshold, the zoom ratio is decremented by the predetermined ratio and the display content is reduced. On the other hand, every time the force with which the operation body presses the display surface decreases to fall below the pressure threshold, the zoom ratio is incremented by the predetermined ratio and the display content is enlarged. Thereby, it is possible to change the zoom ratio step by step (discretely).

Alternatively, the zoom ratio may continuously change according to a change in the force with which the display surface is pressed. In this case, if the force with which the display surface is pressed is strong, the zoom ratio is reduced and the display content is reduced according to the strong force. On the other hand, if the force with which the display surface is pressed is weak, the zoom ratio is increased and the display content is enlarged according to the weak force. As described above, it is possible to finely set the zoom ratio because a continuous zoom ratio change is possible.

If the force with which the operation body presses the display surface is determined to have exceeded a pressure threshold in step S208, the zoom ratio is changed so that the display content displayed on the display area 310 is reduced by the method as described above. If the zoom ratio change of step S210 is made, it returns to the process of step S206.

On the other hand, if the force with which the display surface is pressed is determined to have decreased in step S206, it is determined whether or not the pressure has decreased by an amount greater than or equal to a predetermined ratio within a predetermined time (step S212). In step S212, the zoom ratio is determined and it is determined whether or not to fix the zoom ratio. This determination is made on the basis of a method of relaxing the force with which the display surface is pressed as in the first embodiment. For example, if the operation body is released from the display surface, or in light contact with the display surface, from a state in which the operation body has pressed the display surface, the pressure on the display surface is reduced to a large extent. In this case, the pressure determination unit 140 determines that the pressure has decreased by an amount greater than or equal to the predetermined ratio within the predetermined time. In this embodiment, when the operation as described above has been performed, a current zoom ratio is determined and fixed (step S214). The predetermined time can be, for example, 100 msec, and the predetermined ratio can be, for example, 80%.

If the zoom ratio is fixed, the operation control unit 120 determines whether or not the operation body in contact with the display surface has moved on the display surface (step S216). As in step S202, the movement of the operation body can be recognized. When it is recognized that the operation body is moving, the operation control unit 120 moves the display range displayed on the display area 310 of the display unit 116 along with the movement of the operation body (step S218). At this time, display content displayed on the display area 310 is displayed at the fixed zoom ratio in step S216. Therefore, if the zoom ratio decreases and reduction is made in step S216, it is possible to largely move the display range in step S218. On the other hand, if the zoom ratio increases and enlargement is made in step S216, it is possible to finely move the display range in step S218.

If the display range has moved in step S218, or if the movement of the operation body has not been recognized in step S216, the pressure determination unit 140 determines whether or not the operation body has been released from the display surface (step S220). Whether or not the operation body has been released from the display surface is determined by the contact determination unit 130 according to whether or not an electrostatic capacitance value detected by the contact detection unit 112 is less than or equal to a predetermined electrostatic capacitance value. The contact determination unit 130 determines that the operation body has been released from the display surface when the detected electrostatic capacitance value is less than or equal to the predetermined value, and determines that the operation body has not been released from the display surface when the detected electrostatic capacitance is greater than the predetermined value. Alternatively, when a pressure value detected by the pressure detection unit 114 is less than or equal to a predetermined value, the pressure determination unit 140 may determine that the operation body has been released from the display surface.

On the basis of this determination, the process is iterated from step S216 until the operation body is determined to have been released from the display surface in step S220. On the other hand, if the operation body is determined to have been released from the display surface in step S220, the operation control unit 120 determines whether or not the operation body has moved from an initial position where the operation body has initially made contact with the display surface (step S222). The operation control unit 120 determines that the operation body has moved from the initial position when the operation body has been separated by an amount greater than or equal to a predetermined distance by comparing a current position to the initial position on the display surface of the operation body recognized by the pressure determination unit 140.

In step S222, if the operation body moves from the initial position until the operation body is released from the display surface, it is estimated that the zoom ratio change in step S210 has been made with intent to move the display range displayed on the display area 310. In this case, after the movement of the display range has ended, the zoom ratio is returned to a zoom ratio before the change in step S210, and its information is displayed in an easily viewable state for the user (step S224). On the other hand, if it is determined that there is no movement from the initial position until the operation body is released from the display surface in step S222, the zoom ratio change in step S210 is estimated as an operation in which the user has enlarged/reduced the display content to view it in a desired state. Therefore, in this case, a current zoom ratio is maintained even when the operation body has been released from the display surface (step S226). Thereafter, the operation control process ends.

The operation control method according to this embodiment has been described above. By performing the operation control as described above, for example, as illustrated in the state (a) of FIG. 10, if a finger, which is an operation body, makes contact with the display surface and presses the display surface in a state in which a map is displayed on the display area 310, a zoom ratio is reduced according to a pressing force and the map displayed on the display area 310 is reduced. If the force with which the finger presses the display surface is rapidly weakened when a desired zoom ratio has been reached, the zoom ratio is fixed as illustrated in a state (b) at that time.

Thereafter, if the user moves the finger in contact with the display surface in a direction in which the display range has moved, the display range to be displayed on the display area 310 moves as illustrated in a state (c). When the movement of the display range ends and the finger is released from the display surface, the display range is displayed at a zoom ratio before a zoom ratio change as illustrated in a state (d). That is, the display content is enlarged and displayed at a zoom ratio before reduction in the state (a).

According to the operation control method related to this embodiment as described above, it is possible to increase or decrease the zoom ratio of the display content by increasing or decreasing the force with which the operation body presses the display surface. Using this operation, an operation of making a change to a zoom ratio suitable for display as a series of operations by one finger can be performed again after an operation of making a change to a zoom ratio suitable for movement and moving the display range. Thereby, it is possible to reduce the user's operational load.

3. Third Embodiment

Next, an operation control method according to the third embodiment of the present invention will be described on the basis of FIGS. 11 to 19. In this embodiment, when content is selected from a content list using the operation control method, the operation body changes a direction in which the list is scrolled by changing the force with which the operation body presses the display surface. The operation control method of this embodiment can be executed by the same device as the input display device 100 having the operation control unit 120 according to the first embodiment. Hereinafter, the operation control method according to this embodiment will be described in detail and detailed description of a configuration and function of the input display device 100 having the same operation control unit 120 as in the first embodiment is omitted.

[Overview of Operation on Content List]

Figure 11:
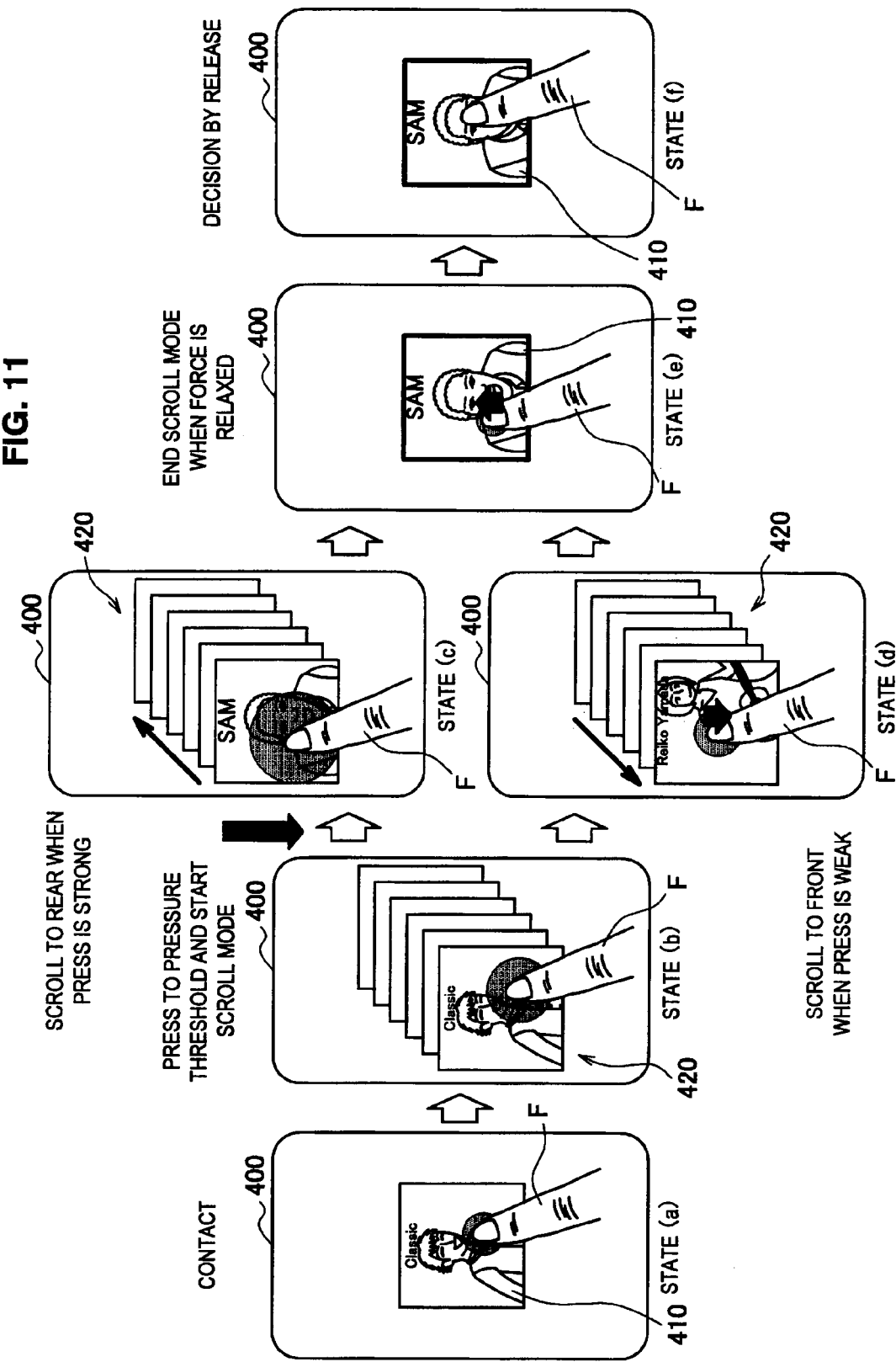
FIG. 11 is an explanatory diagram illustrating an overview of an operation on a content list by an operation control method according to a third embodiment of the present invention.

First, the overview of the operation on the content list using the operation control method according to this embodiment will be described on the basis of FIG. 11. FIG. 11 is an explanatory diagram illustrating the overview of the operation on the content list by the operation control method according to the third embodiment of the present invention. In this embodiment, an operation of determining desired content 410 by scrolling a content list 420 displayed on a display area 400 of the display surface of the display unit 116 is shown. As illustrated in a state (b) of FIG. 11, the content list 420 has a configuration in which a plurality of pieces of content 410 are layered from the front to the rear of the paper, and can be scrolled from the front to the rear or from the rear to the front. In addition, the content 410 of this embodiment is provided in a multimedia environment such as a computer, and an example of the content 410 is information such as a video, a still image, or audio. The content list 420 can be considered as an object list including the content 410 of objects.

First, if the finger F is in contact with the content 410 displayed on the display area 400 as illustrated in the state (a) of FIG. 11, the content list 420 having a configuration in which the plurality of pieces of content 410 are layered is displayed on the display area 400 as illustrated in the state (b) of FIG. 11. The user can determine the content 410 by scrolling the content list 420 and displaying the content 410 to be selected on the foreground of the content list 420. The content list 420 illustrated in the state (b) of FIG. 11 can be scrolled from the rear direction to the front direction of FIG. 11 by the user changing the force with which the display surface is pressed.

For example, if the user increases the force with which the display surface is pressed, it is possible to scroll the content list 420 in the rear direction as illustrated in a state (c). On the other hand, if the user decreases the force with which the display surface is pressed, it is possible to scroll the content list 420 in the front direction as illustrated in a state (d). As described above, it is possible to change the scrolling direction of the content list 420 by increasing or decreasing the force with which the display surface is pressed using the operation control method of this embodiment.

If desired content is positioned on the foreground of the content list 420 by scrolling the content list 420 as illustrated in the state (c) or (d), the user can end the scroll mode by reducing the force with which the operation body presses the display surface by an amount greater than or equal to a predetermined ratio within a predetermined time (state (e)). At this time, the content list 420 is not displayed and only content 410 displayed on the foreground may be displayed. Thereby, the selected content 410 can be reported to the user in an easy-to-understand manner. As illustrated in a state (f), the operation body is released from the display surface, so that the displayed content 410 can be determined.

Figure 12:
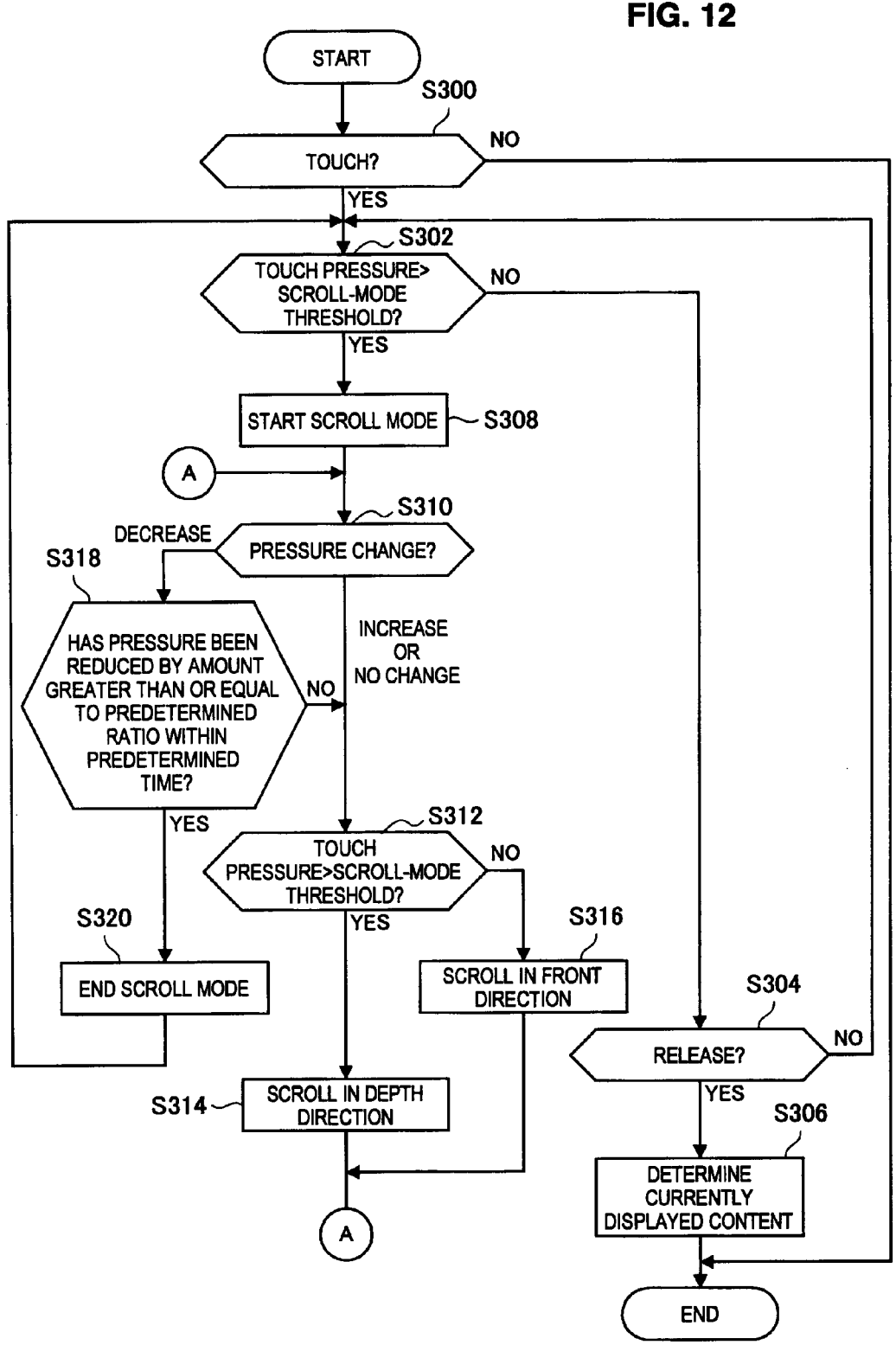
FIG. 12 is a flowchart illustrating the operation control method according to the same embodiment.
Figure 14:
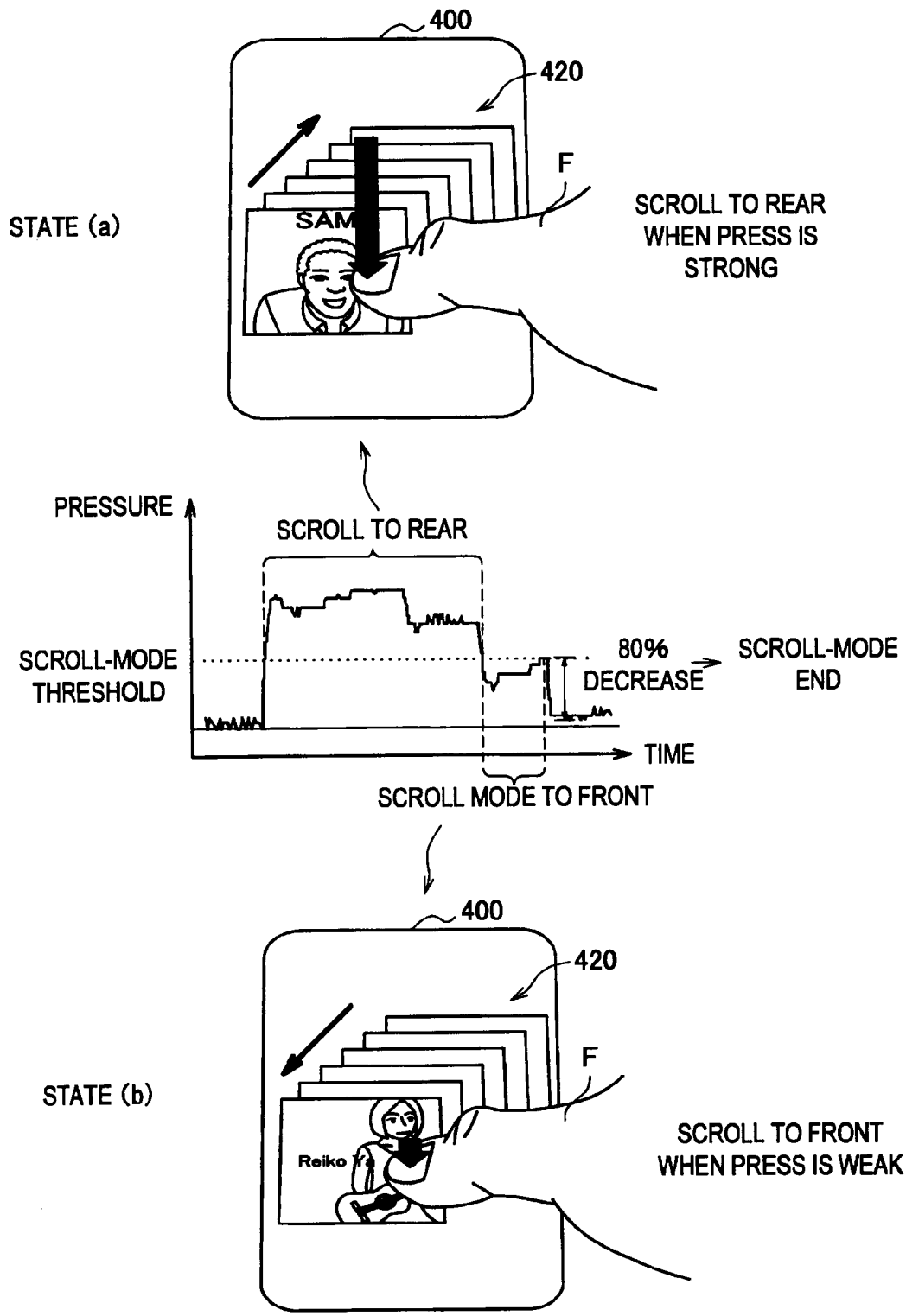
FIG. 14 is an explanatory diagram illustrating an operation of scrolling the content list according to the same embodiment.
Figure 16:
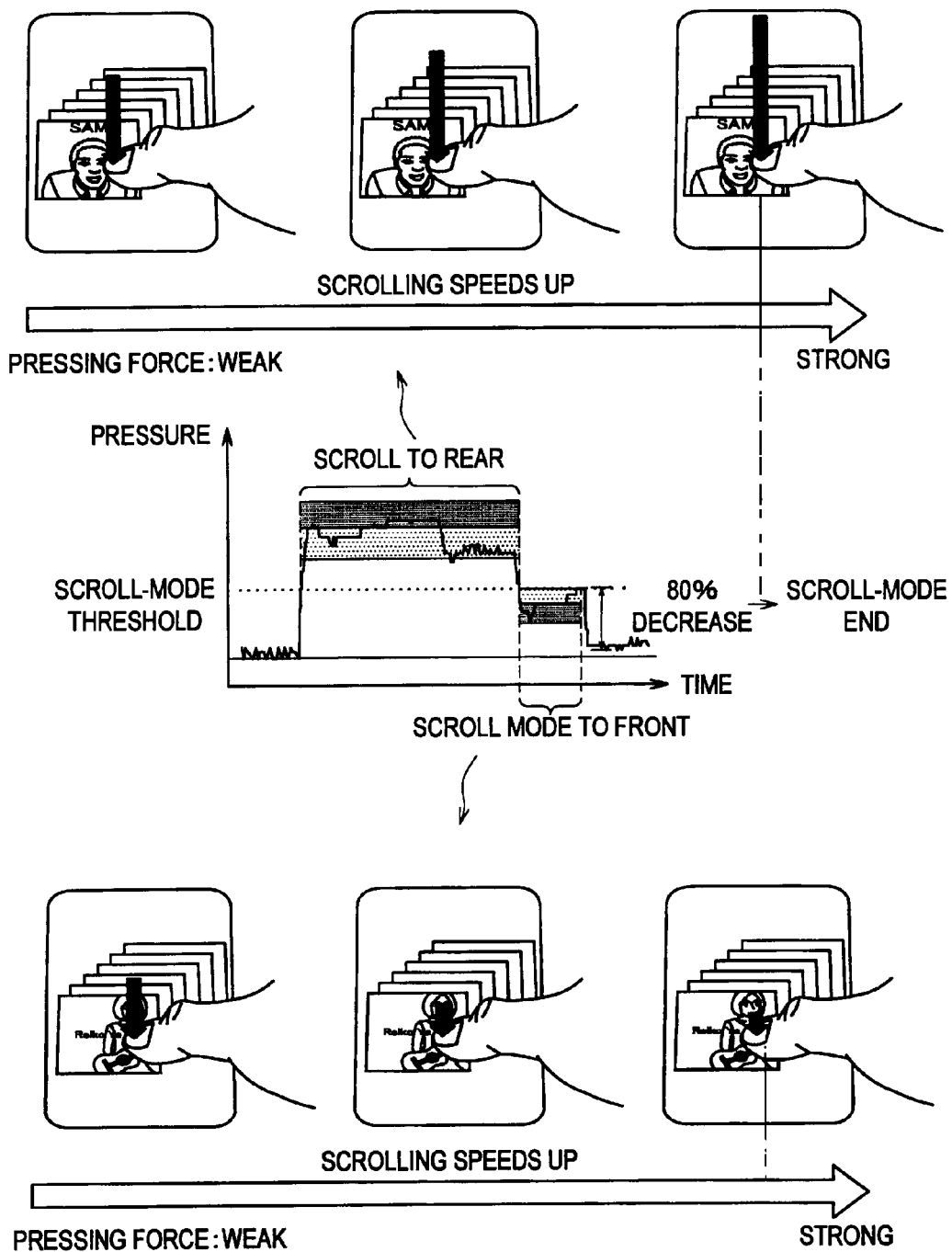
FIG. 16 is an explanatory diagram illustrating an operation of changing a scroll speed at which the content list is scrolled according to the same embodiment.

As described above, it is possible to change a direction in which the content list 420 is scrolled by changing the force with which the display surface is pressed in the operation control method according to this embodiment. Hereinafter, the operation of scrolling the content list 420 using the operation control method according to this embodiment will be specifically described on the basis of FIGS. 12 to 17. FIG. 12 is a flowchart illustrating an operation control method according to this embodiment. FIG. 13 is an explanatory diagram illustrating operations of starting and ending a scroll mode of the content list 420 according to this embodiment. FIG. 14 is an explanatory diagram illustrating an operation of scrolling the content list 420 according to the same embodiment. FIG. 15 is an explanatory diagram illustrating an operation of determining content from the content list 420 according to this embodiment. FIG. 16 is an explanatory diagram illustrating an operation of changing a scroll speed at which the content list 420 is scrolled according to this embodiment. FIG. 17 is an explanatory diagram illustrating an operation when the operation body has been released during the scrolling of the content list 420 according to this embodiment.

[Operation Control Method]

The user first causes the content list 420 including the plurality of pieces of content 410 to be displayed so as to select content 410 the user wants to watch using the input display device 100. It is possible to display the content list 420, for example, by performing a predetermined operation such as pressing until pressure exceeds a predetermined pressure threshold (scroll-mode threshold) in contact with the content 410 displayed on the display area 400 as illustrated in the state (a) of FIG. 11. As described above, if the content list 420 is displayed as in the state (b), the content list 420 is in the scroll mode in which scrolling is possible.

That is, first, it is detected whether or not the operation body has made contact with (touched) the display surface in the operation control method according to this embodiment (step S300). As in step S100 of the first embodiment, the contact of the operation body with the display surface is determined by the contact determination unit 130 according to whether or not an electrostatic capacitance value detected by the contact detection unit 112 has exceeded a predetermined electrostatic capacitance value. The contact determination unit 130 determines that the operation body has made contact with the display surface when the detected electrostatic capacitance value has exceeded the predetermined value, and determines that the operation body has not made contact with the display surface when the detected electrostatic capacitance value is less than the predetermined value. Based on this determination, this operation control process ends if the contact of the operation body with the display surface is not detected.

If the contact of the operation body with the display surface is detected in step S300, it is determined whether or not the force (touch pressure) with which the operation body presses the display surface has exceeded the scroll-mode threshold (step S302). An amount of pressure by the operation body on the display surface is determined by the pressure determination unit 140. The scroll-mode threshold is used to determine whether or not scrolling of the content list 420 is possible. When the force with which the operation body presses the display surface has exceeded the scroll-mode threshold, the scrolling of the content list 420 is possible. Therefore, when the finger F presses the display surface as in a state (a) of FIG. 13 and the pressure applied to the display surface exceeds the scroll-mode threshold as illustrated in the graph of FIG. 13, the scroll mode is initiated (step S308). As described above, it is possible to switch the scroll mode and also prevent the content list 420 from being erroneously scrolled by intentionally changing the force with which the display surface is pressed by the finger F.

On the other hand, if the touch pressure is determined to be less than or equal to the scroll-mode threshold in step S302, it is determined whether or not the operation body has been released from the display surface (step S304). As in step S220 of the second embodiment, whether or not the operation body has been released from the display surface is determined by the contact determination unit 130 according to whether or not the electrostatic capacitance value detected by the contact detection unit 112 is less than or equal to the predetermined electrostatic capacitance value. The contact determination unit 130 determines that the operation body has been released from the display surface when the detected electrostatic capacitance value is less than or equal to the predetermined value, and determines that the operation body has not been released from the display surface when the detected electrostatic capacitance is greater than the predetermined value. Alternatively, when a pressure value detected by the pressure detection unit 114 is less than or equal to a predetermined value, the pressure determination unit 140 may determine that the operation body has been released from the display surface.

On the basis of this determination, if the operation body is determined to have been released from the display surface in step S304, selection of the content 410 displayed on the foreground of the scroll list 420 is determined at that time as illustrated in a state (a) of FIG. 15 (step S306). Thereafter, the process ends. On the other hand, if the operation body is determined not to have been released from the display surface in step S304, the process is iterated by returning to step S302.

The process returns to step S308 and it is determined whether or not the force with which the operation body presses the display surface has changed if the scrolling of the content list 420 is possible (step S310). As in step S206 of the second embodiment, an amount of pressure by the operation body on the display surface is determined by the pressure determination unit 140. The pressure determination unit 140 first determines whether or not the pressure sensed by the pressure detection unit 114 has changed from previous pressure. If it is determined that there is no pressure change or that the pressure has increased, it is determined whether or not the detected touch pressure has exceeded the predetermined pressure threshold, for example, the scroll-mode threshold (step S312).

If the touch pressure is determined to have exceeded the scroll-mode threshold in step S312 as illustrated in the graph of FIG. 14, the content list 420 is scrolled in the rear direction as illustrated in a state (a) of FIG. 14 (step S314). On the other hand, as will be described later, if the touch pressure is determined not to have exceeded the scroll-mode threshold, the content list 420 is scrolled in the front direction as illustrated in a state (b) of FIG. 14 (step S316). The process is iterated by returning to the process of step S310. As described above, a scrolling direction of the content list 420 is determined according to whether or not the pressing force exceeds the scroll-mode threshold, regardless of the presence/absence of a change in the force with which the operation body presses the display surface in the operation control method by the display control unit 120 according to this embodiment.

In addition, if the pressure is determined to have decreased in step S310, it is determined whether or not the pressure has decreased by an amount greater than or equal to a predetermined ratio within a predetermined time (step S318). In step S318, it is determined whether or not to end the scroll mode. This determination is made on the basis of a method of relaxing the force with which the display surface is pressed as in the first embodiment. For example, if the operation body is released from the display surface, or in light contact with the display surface, from a state in which the operation body has been pressed on the display surface, the pressure on the display surface is instantaneously reduced to a large extent as illustrated in the graph of FIG. 13. In this case, the pressure determination unit 140 determines that the pressure has decreased by an amount greater than or equal to the predetermined ratio within the predetermined time. In this embodiment, when an operation as illustrated in the state (b) of FIG. 13 has been performed, the scroll mode ends (step S320). The predetermined time can be, for example, 100 msec, and the predetermined ratio can be, for example, 80%.

After the scroll mode has ended, it returns to the process of step S302, and it is determined whether or not the touch pressure has exceeded the scroll-mode threshold (step S302). If it is detected that the touch pressure is less than the scroll-mode threshold and the operation body has been released from the display surface in step S304, the selection of content positioned on the foreground of the content list 420 at that time is determined as illustrated in a state (b) of FIG. 15 (step S306). Thus, the content 410 is selected.

On the other hand, if the pressure is determined not to have decreased by an amount greater than or equal to the predetermined ratio within the predetermined time in step S318, it proceeds to the process of step S312. The scrolling direction of the content list 420 is determined according to whether or not the touch pressure has exceeded the scroll-mode threshold (step S312). The content list 420 is scrolled in the depth direction or the front direction (steps S314 and S316).

The scrolling of the content list 420 using the operation control method according to this embodiment has been described above. As described above, because it is possible to change the scrolling direction of the content list 420 by changing the force with which the finger F presses the display surface, it is possible to perform an operation of scrolling the content list 420 or an operation of determining the content 410 with one finger F.

Here, when the content list 420 is scrolled in steps S312 to S316, a scroll speed of the content list 420 may change according to a magnitude of the force with which the operation body presses the display surface.

For example, if the scroll list 420 is scrolled in the rear direction, the operation body presses the display surface at a pressure that exceeds the scroll-mode threshold as illustrated in the graph of FIG. 16. At this time, when the force with which the display surface is pressed exceeds a predetermined pressure threshold that is greater than the scroll-mode threshold, the scroll speed at which the scroll list 420 is scrolled is high. That is, the stronger the force with which the operation body presses the display surface, the higher the scroll speed.

On the other hand, if the scroll list 420 is scrolled in the front direction, the operation body presses the display surface at a pressure that falls below the scroll-mode threshold as illustrated in the graph of FIG. 16. At this time, when the force with which the display surface is pressed further falls below a predetermined threshold that is less than the scroll-mode threshold, the scroll speed at which the scroll list 420 is scrolled is high. That is, the weaker the force with which the operation body presses the display surface, the higher the scroll speed.

As described above, it is possible to shorten a search time of the content 410 and further improve operability by changing the force with which the display surface is pressed and changing the scroll speed. For example, this operation is particularly effective if the number of pieces of content 410 included in the content list 420 is large and a scroll amount in which the scroll list 420 moves is large. Although the scroll speed may change step by step by providing a predetermined pressure threshold for changing the scroll speed as illustrated in FIG. 16, the scroll speed may continuously change, for example, according to a change in the force with which the operation body presses the display surface.

The case where the operation body is released from the display surface during the scroll mode has not been described in the operation control method illustrated in FIG. 12. However, in this case, the content 410 may be determined, for example, simultaneously when the scroll mode ends. That is, as illustrated in the graph of FIG. 17, the operation body presses the display surface with a force exceeding the scroll-mode threshold, thereby scrolling the content list 420 in the rear direction. Here, if the operation body is released from the display surface during the scrolling of the content list 420, the operation control unit 120 ends the scroll mode and the selection of the content 410 displayed on the foreground of the content list 420 is determined when the scrolling has ended. As described above, it is possible to further improve the operability by causing one operation to execute two processes.

[Scrolling of Lateral Content List]

The operation control method according to this embodiment can also be applied, for example, to the scrolling of a lateral content list 440 in which content 410 is arranged in a lateral direction of the display area 400 as well as the scrolling of the content list 420 in the depth direction described above. FIGS. 18A and 18B are explanatory diagrams illustrating scroll operations in the lateral content list 440.

The display area 400 of the input display device 100 illustrated in FIGS. 18A and 18B has a long shape extending in the lateral direction. A lateral content list 440 is configured by arranging the plurality of pieces of content 410 in the lateral direction according to the shape of the display area 400. The lateral content list 440 as described above can be scrolled in the lateral direction, that is, on the left and right in FIG. 18A. As in the scrolling of the above-described content list 420, the content list 420 displayed on the display area 400 of the input display device 100 can also be scrolled to the left/right according to the force with which the display surface is pressed. In addition, in this example, it is possible to improve operability by determining the scrolling direction according to a position where the operation body is in contact with the display surface.

That is, the lateral content list 440 is scrolled in a direction of the display area 400 being operated by the operation body when the force with which the operation body presses the display surface is strong so that it is easy for the user to intuitively perform an operation. As described above, the scrolling direction of the lateral content list 440 directed to a side on which the operation body is positioned becomes a forward direction. On the other hand, when the force with which the operation body presses the display surface is weak, the lateral content list 440 is scrolled in a direction of the side opposite to the display area 400 being operated by the operation body. As described above, the scrolling direction of the lateral content list 440 to a side opposite to the side on which the operation body is positioned becomes a reverse direction. Thus, the scrolling direction of the lateral content list 440 is determined according to a position where the operation body is in contact with the display surface, so that the user can intuitively scroll the lateral content list 440 and operability can be improved.

For example, a right-handed user is likely to perform an input operation with the right hand. Thus, as illustrated in FIG. 18A, in general, an operation of scrolling the lateral content list 440 is performed by a finger RF of the right hand that presses the display surface in a right area 400R of the right side rather than a center C of the display area 400. In this case, if the finger RF presses the display surface, the lateral content list 440 is scrolled to the side of the right area 400R being operated by the finger RF. On the other hand, if the force with which the finger RF presses the display surface is weak, the lateral content list 440 is scrolled to the side of a left area 400L opposite to the area operated by the finger RF.

On the other hand, a left-handed user is likely to perform an input operation with the left hand. Thus, as illustrated in FIG. 18B, in general, an operation of scrolling the lateral content list 440 is performed by a finger LF of the left hand that presses the display surface in the left area 400L of the left side rather than the center C of the display area 400. In this case, if the finger LF presses the display surface, the lateral content list 440 is scrolled to the side of the left area 400L being operated by the finger LF. On the other hand, if the force with which the finger LF presses the display surface is weak, the lateral content list 440 is scrolled to the side of the right area 400R opposite to the area operated by the finger LF.

As described above, it is possible to switch the scrolling direction of the lateral content list 440 by changing the force with which the operation body presses the display surface. In addition, the scrolling direction of the lateral content list 440 is determined according to a position of the display area to be operated by the operation body. Thereby, because the user can intuitively perform an operation, the operability can be improved.

[Operation on Content Having Time Series]

In addition, the operation control unit 120 according to this embodiment can also control a reproduction direction of moving-image content 410m according to the force with which the operation body presses the display surface when the moving-image content 410m having time series such as a moving image is included in the content 410 constituting the lateral content list 440.

Figure 19:
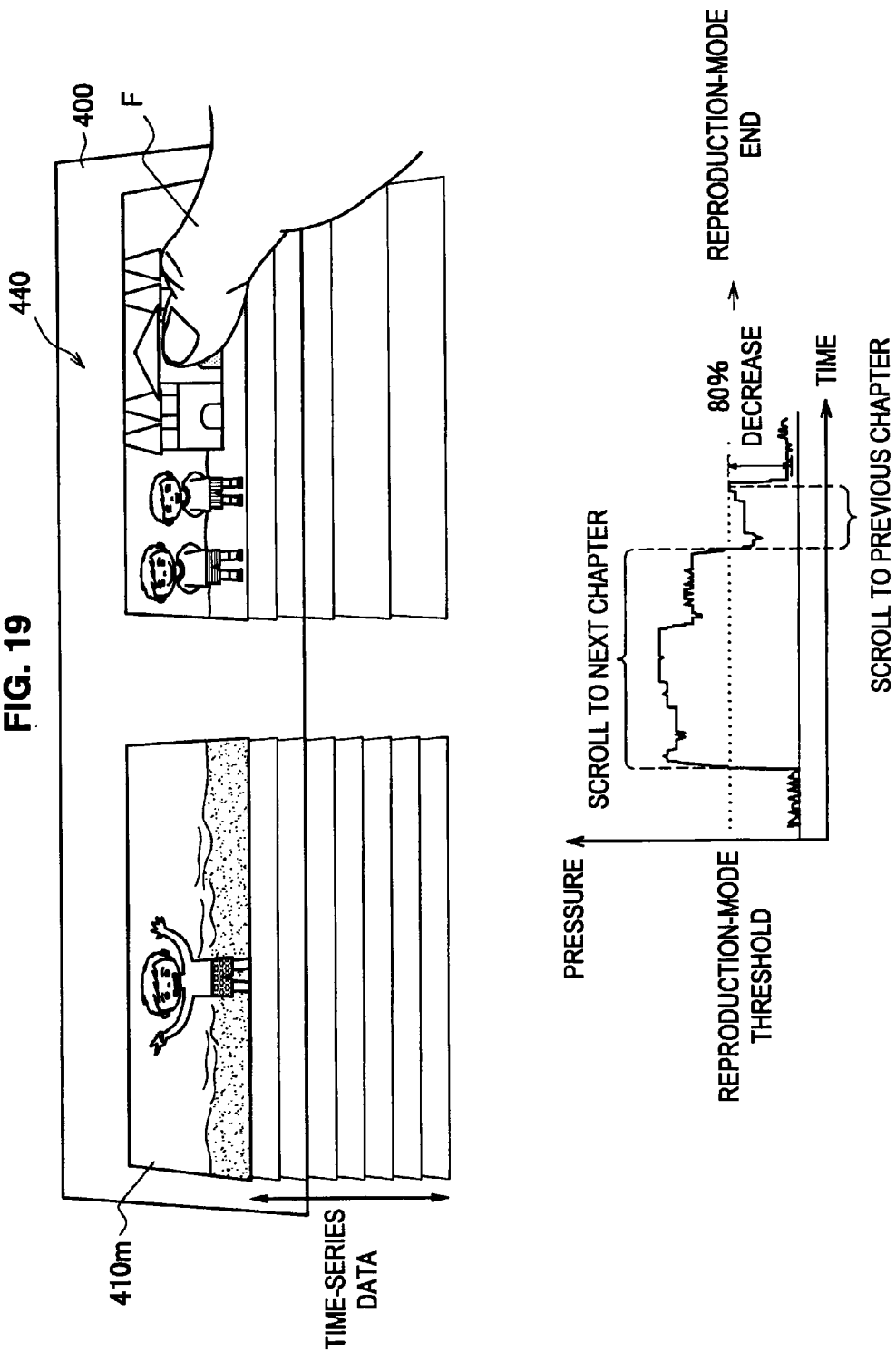
FIG. 19 is an explanatory diagram illustrating an operation of reproducing moving-image content having time series.
Figure 20:
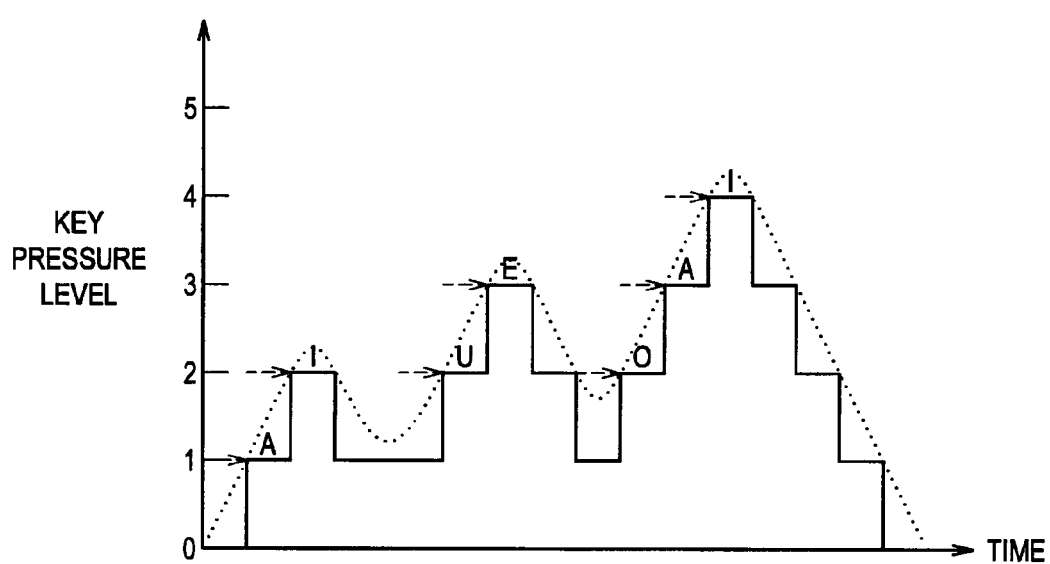
FIG. 20 is an explanatory diagram illustrating an example of a scroll operation of the related art.

FIG. 19 is an explanatory diagram illustrating an operation of reproducing the moving-image content 410m having time series. As illustrated in FIG. 19, the lateral content list 440 includes a plurality of pieces of moving-image content 410m arranged in the lateral direction of the display area 400. For example, if one piece of the moving-image content 410m from the lateral content list 440 is tapped, the moving-image content 410m is selected and content reproduction is initiated. On the other hand, if pressure that exceeds a predetermined pressure threshold (reproduction-mode threshold) is applied to the display surface by the operation body in contact with the moving-image content 410m, it is switched to a reproduction mode in which a reproduction state of the moving-image content 410m can be operated.

During the reproduction mode, the user can change the reproduction direction of the moving-image content 410m by changing the force with which the display surface is pressed to a value that is greater or less than a predetermined reproduction-mode threshold. For example, if the display surface is pressed by the force that exceeds the reproduction-mode threshold, the moving-image content 410m is reproduced in a direction of a time lapse so that movement to the next chapter is performed. On the other hand, if the force with which the display surface is pressed is less than or equal to the reproduction-mode threshold, the moving-image content 410m is reproduced by rewind playback for movement to a previous chapter. Reproduction movement of the moving-image content 410m may be performed in predetermined time units or chapter units. It is possible to end the reproduction mode if the force with which the display surface is pressed is reduced by an amount greater than or equal to a predetermined ratio within a predetermined time (for example, 80% in 100 msec) in the reproduction mode.

As described above, the operation control method according to this embodiment can be applied to an operation of reproducing the moving-image content 410 as well as scrolling of the lateral content list 440. Thereby, the user can perform various input operations by an easy operation.

The operation control method according to this embodiment has been described above. As described above, according to the operation control method related to this embodiment, it is possible to switch the scrolling direction of the content lists 420 and 440 by increasing or decreasing the force with which the operation body presses the display surface. For example, if the moving-image content 410m is selected using this operation, it is also possible to perform an operation of reproducing the moving-image content 410m by further changing the force with which the operation body presses the display surface. As described above, it is possible to perform an operation as a series of operations with one finger and reduce the user's operational load.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, although the electrostatic touch panel 105 and the pressure sensor 106 are provided as the input device in the above-described embodiment, the present invention is not limited to this example. For example, only the pressure sensor 106 may be provided. In this case, the pressure sensor 106 senses whether or not the operation body has made contact with the display surface. For example, when pressure detected by the pressure sensor 106 is greater than or equal to a predetermined value, the operation body may be sensed to be in contact with the display surface.

In addition, although the display content is reduced by decreasing the zoom ratio if the force with which the operation body presses the display surface is strong, and the display content is enlarged by increasing the zoom ratio if the force with which the operation body presses the display surface is weak in the above-described second embodiment, the present invention is not limited to this example. For example, the display content may be enlarged by increasing the zoom ratio if the force with which the operation body presses the display surface is strong, and the display content may be reduced by decreasing the zoom ratio if the force with which the operation body presses the display surface is weak.

REFERENCE SIGNS LIST

100 Input display device
110 Input display unit
112 Contact detection unit
114 Pressure detection unit 116 Display unit
120 Operation control unit
130 Contact determination unit
140 Pressure determination unit
150 Storage unit
160 Display control unit
220 Scroll list
310, 400 Display area
410 Content
410m Moving-image content
420 Content list
440 Lateral content list

The invention claimed is:

1. An operation control device comprising:
a contact detection unit for detecting contact of an operation body with a display surface of a display unit on which information is displayed;
a pressure detection unit, provided on the display unit, for detecting a pressure at which the operation body presses the display surface of the display unit; and
an operation control unit for changing a display state of the information displayed on the display unit in a forward or reverse direction on the basis of an amount of pressure detected by the pressure detection unit until the operation body makes contact with and is separated from the display surface of the display unit,
wherein, when an object list in which a plurality of objects are arranged in one direction is displayed on the display unit, the operation control unit:
scrolls the object list in the forward direction step by step every time the pressure detected by the pressure detection unit exceeds one or more pressure thresholds set step by step, and
scrolls the object list in the reverse direction, which is a direction opposite to the forward direction, step by step every time the pressure detected by the pressure detection unit falls below the pressure thresholds set step by step, and
enters selection of a focused object of the object list when the pressure detected by the pressure detection unit has decreased by an amount greater than or equal to a first predetermined ratio within a first predetermined time prior to release of pressure.

2. The operation control device according to claim 1, wherein the operation control unit:
changes the display state of the information displayed on the display unit in the forward direction every time the pressure detected by the pressure detection unit exceeds one or more pressure thresholds set step by step, and
changes the display state of the information displayed on the display unit in the reverse direction every time the pressure detected by the pressure detection unit falls below the pressure thresholds set step by step.

3. The operation control device according to claim 1, wherein the operation control unit:
continuously changes the display state of the information displayed on the display unit in the forward direction if the pressure detected by the pressure detection unit is greater than a predetermined pressure threshold, and
continuously changes the display state of the information displayed on the display unit in the reverse direction if the pressure detected by the pressure detection unit is less than the predetermined pressure threshold.

4. The operation control device according to claim 1, wherein the operation control unit starts a change in the forward or reverse direction of the display state of the information displayed on the display unit when the pressure detected by the pressure detection unit has exceeded a predetermined pressure threshold.

5. The operation control device according to claim 1, wherein the operation control unit ends a change in the forward or reverse direction of the display state of the information displayed on the display unit when the pressure detected by the pressure detection unit has decreased by an amount greater than or equal to a second predetermined ratio within a second predetermined time.

6. The operation control device according to claim 1, wherein, when an object list in which a plurality of objects are arranged in one direction is displayed on the display unit, the operation control unit:
continuously scrolls the object list in the forward direction if the pressure detected by the pressure detection unit is greater than a predetermined pressure threshold, and
continuously scrolls the object list in the reverse direction, which is a direction opposite to the forward direction, if the pressure detected by the pressure detection unit is less than the predetermined pressure threshold.

7. The operation control device according to claim 1, wherein:
the contact detection unit detects a contact area in contact with the operation body between two areas into which the display surface of the display unit is divided in an arrangement direction of the objects, and
the operation control unit sets a direction toward the contact area among scrolling directions of the object list to the forward direction.

8. The operation control device according to claim 1, wherein, when an object determined from the object list has time-series data,
the operation control unit:
reproduces the determined object in order of time series when the contact detection unit has detected that the operation body has been separated from the display surface of the display unit, and
moves display of the determined object in a forward or reverse direction of time series according to an amount of pressure detected by the pressure detection unit if the contact detection unit detects that the operation body is continuously in contact with the display surface of the display unit.

9. The operation control device according to claim 1, wherein, when information for changing a zoom ratio of display content is displayed on the display unit,
the operation control unit:
decreases the zoom ratio of the display content displayed on the display unit step by step every time the pressure detected by the pressure detection unit exceeds one or more pressure thresholds set step by step, and
increases the zoom ratio of the display content displayed on the display unit step by step every time the pressure detected by the pressure detection unit falls below the pressure thresholds set step by step.

10. The operation control device according to claim 9, wherein the operation control unit fixes a currently set zoom ratio when the pressure detected by the pressure detection unit has decreased by an amount greater than or equal to a predetermined ratio within a predetermined time.

11. The operation control device according to claim 10, wherein the operation control unit:
moves a display range of the information displayed on the display unit according to movement of the operation body in a state in which the operation body is in contact with the display surface of the display unit, and changes the zoom ratio to a zoom ratio before a change when the contact detection unit has detected that the operation body has been separated from the display surface of the display unit.

12. The operation control device according to claim 1, wherein, when information for changing a zoom ratio of display content is displayed on the display unit,
the operation control unit:
decreases the zoom ratio of the display content displayed on the display unit step by step if the pressure detected by the pressure detection unit is greater than a predetermined pressure threshold, and
increases the zoom ratio of the display content displayed on the display unit step by step if the pressure detected by the pressure detection unit is less than the predetermined pressure threshold.

13. An operation control method performed by an apparatus, comprising the steps of
detecting contact of an operation body with a display surface of a display unit on which information is displayed;
detecting a pressure at which the operation body presses the display surface of the display unit in a state in which a detection unit is provided on the display unit; and
changing a display state of the information displayed on the display unit in a forward or reverse direction on the basis of an amount of pressure detected until the operation body makes contact with and is separated from the display surface of the display unit, wherein, when an object list in which a plurality of objects are arranged in one direction is displayed on the display unit:
scrolling the object list in the forward direction step by step every time the pressure detected exceeds one or more pressure thresholds set step by step, and
scrolling the object list in the reverse direction, which is a direction opposite to the forward direction, step by step every time the pressure detected falls below the pressure thresholds set step by step, and
enters a selection of a focused object of the object list when the pressure detected has decreased by an amount greater than or equal to a predetermined ratio within a predetermined time prior to release of pressure.

14. A non-transitory computer-readable medium having embodied thereon a program, which when executed by a processor of an apparatus functions as an operation control device comprising:
a contact detection means for detecting contact of an operation body with a display surface of a display unit on which information is displayed;
a pressure detection means, provided on the display unit, for detecting a pressure at which the operation body presses the display surface of the display unit; and
an operation control means for changing a display state of the information displayed on the display unit in a forward or reverse direction on the basis of an amount of pressure detected by the pressure detection means until the operation body makes contact with and is separated from the display surface of the display unit,
wherein, when an object list in which a plurality of objects are arranged in one direction is displayed on the display unit, the operation control unit:
scrolls the object list in the forward direction step by step every time the pressure detected by the pressure detection unit exceeds one or more pressure thresholds set step by step, and
scrolls the object list in the reverse direction, which is a direction opposite to the forward direction, step by step every time the pressure detected by the pressure detection unit falls below the pressure thresholds set step by step, and
enters selection of a focused object of the object list when the pressure detected by the pressure detection unit has decreased by an amount greater than or equal to a predetermined ratio within a predetermined time prior to release of pressure.

* * * * *